US008456507B1

(12) United States Patent
Mallappa et al.

(10) Patent No.: US 8,456,507 B1
(45) Date of Patent: Jun. 4, 2013

(54) INDIVIDUAL PARTICIPANT CONTROL OF CONFERENCE DATA

(75) Inventors: Prasannakumar Mallappa, Union City, CA (US); Thomas E. Miller, Mountain View, CA (US); Pascal R. Crausaz, San Jose, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 459 days.

(21) Appl. No.: 12/751,597

(22) Filed: Mar. 31, 2010

(51) Int. Cl.
*H04N 7/15* (2006.01)

(52) U.S. Cl.
USPC .................. 348/14.08; 348/14.09; 348/14.1; 379/202.01; 379/203.01

(58) Field of Classification Search
USPC ........ 379/202.01; 348/14.08, 14.09; 709/204; 370/260
See application file for complete search history.

(56) References Cited

U.S. PATENT DOCUMENTS

| | | | |
|---|---|---|---|
| 6,501,739 B1 | 12/2002 | Cohen | |
| 7,426,192 B2 | 9/2008 | Amano et al. | |
| 7,558,221 B2* | 7/2009 | Nelson et al. | 370/260 |
| 7,908,321 B1* | 3/2011 | Rust | 709/204 |
| 8,121,277 B2* | 2/2012 | Baird | 379/202.01 |
| 2004/0203677 A1* | 10/2004 | Brown et al. | 455/416 |
| 2004/0207724 A1* | 10/2004 | Crouch et al. | 348/14.09 |
| 2008/0095339 A1* | 4/2008 | Elliott et al. | 379/93.01 |
| 2010/0158232 A1* | 6/2010 | Sylvain | 379/202.01 |

\* cited by examiner

*Primary Examiner* — Joseph J Nguyen
(74) *Attorney, Agent, or Firm* — Patent Law Works LLP

(57) ABSTRACT

A conference call system with a plurality of endpoints, a participant control server, a conference bridge and a switch is described. A first endpoint transmits conference data to the participant control server. The participant control server transmits the conference data to the other endpoints. In response to requests from the endpoint, the participant control server transmits recorded conference data for video, audio and web sessions that are individually controllable to pause, fast-forward and rewind the conference data. The participant control server establishes secondary connections for the endpoints including a ghost hold and a sidebar.

32 Claims, 27 Drawing Sheets

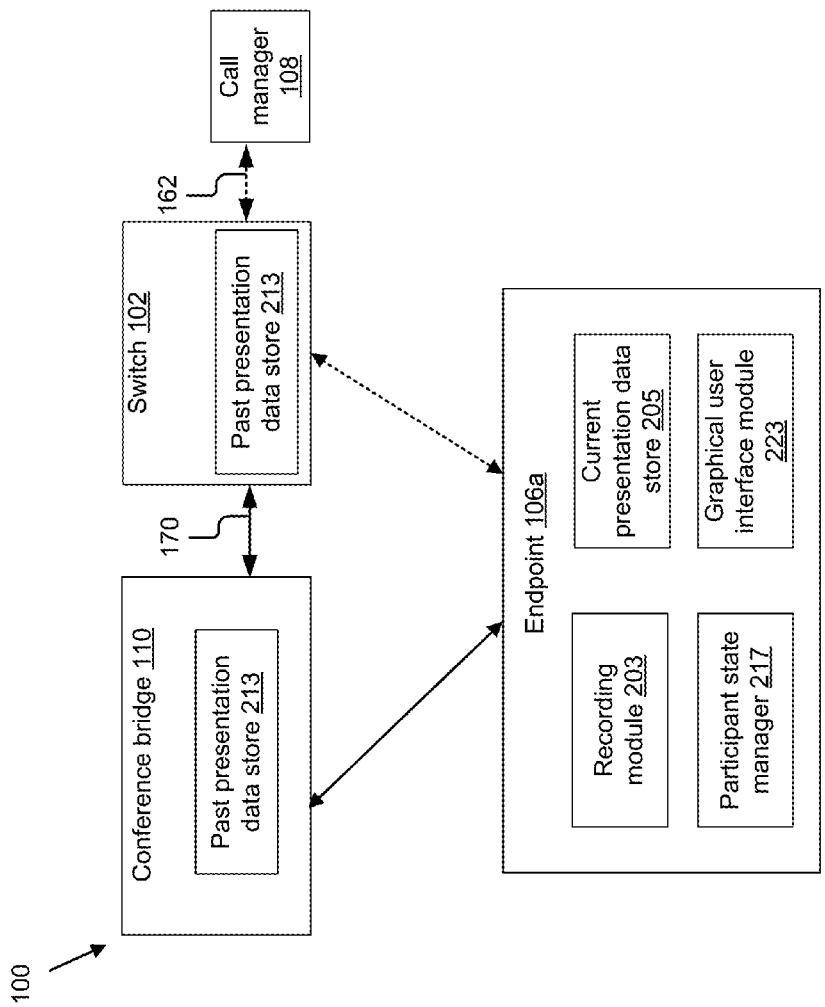

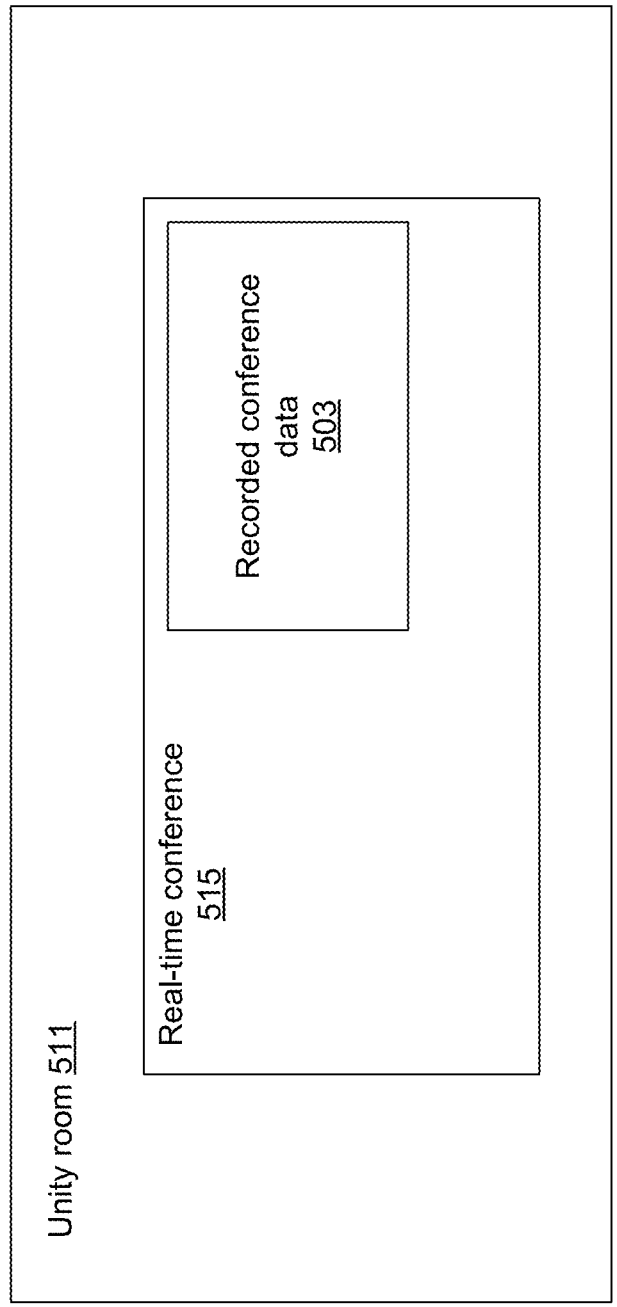

INDIVIDUAL PARTICIPANT CONTROL OF CONFERENCE DATA

BACKGROUND OF THE INVENTION

1. Field of the Invention

The present invention relates to systems and methods for conference participants to individually control real-time and recorded conference data. In particular, the present invention relates to a participant rewinding, fast-forwarding and pausing conference data that includes audio, video and web conference data.

2. Description of the Background Art

During a conference call, a presenter or moderator has the ability to control a presentation, such as a PowerPoint presentation by controlling a slide on the graphical user interface. Participants, however, are limited to passively observing the conference data. They cannot control the timing of when the conference data is presented and they cannot replay conference data that was already presented. As a result, if a participant joins a conference after it has already begun, the participant misses out on vital information. Even if the participants join at the beginning of the conference, they may want to review some of the data, such as an important slide or an explanation previously provided by the presenter.

Digital video recorders (DVR) allow a user that has recorded a live or recorded television show in advance to control the television show by moving backwards, moving forwards or by pausing the video. The control, however, only works for video that is stored on the DVR. If a user started recording a television show halfway through the show, the user cannot rewind to the beginning of the show. DVRs allow users to schedule when to start recording, but this takes advanced planning. Furthermore, the DVR does not allow separate control of the audio and video data.

SUMMARY OF THE INVENTION

The present invention overcomes the deficiencies and limitations of the prior art by providing a system and method for managing real-time and recorded conference data. In particular, the present invention transmits real-time and recorded conference data to endpoints. The present invention includes a graphical user interface for manipulating video, audio and web conference data collectively or separately. In one embodiment of the invention, each type of conference data is individually manipulated for each participant. The graphical user interface enables the user to mute, position to an annotation, pause, fast-forward and rewind real-time conference data and recorded conference data. In one embodiment, the recorded conference data contains annotations to highlight key portions of the conference for newly-joined participants.

In one embodiment, the present invention generates an ante room where a user views the conference data without having to participate in the conference. In one embodiment, the user's presence is not made known to the conference participants when connected to the ante room. When the user is ready to participate, the present invention transfers or connects the user to a unity room where the user is able to participate in the conference. The unity room also includes recorded conference data so that the user can continue to review the conference data during the conference.

In another embodiment a conference participant establishes a ghost hold, which mutes the participant's input audio for the conference. The ghost hold also allows the participant to freeze an image of the participant to give the appearance to other participants that the participant is still part of the conference. The ghost hold enables the participant to initiate a secondary connection using the same conferencing system. In one embodiment, audio for the secondary connection is transmitted to one speaker while audio for the conference is transmitted to a second speaker so that the participant knows when to jump back into the conference as needed.

In yet another embodiment, the present invention enables users to initiate a sidebar. The sidebar enables independent conversations with other conference participants during the conference using, for example, instant messaging, a separate phone call or video conferencing to review and discuss conference data, such as previously recorded audio, video and slides.

BRIEF DESCRIPTION OF THE DRAWINGS

The invention is illustrated by way of example, and not by way of limitation in the figures of the accompanying drawings in which like reference numerals are used to refer to similar elements.

FIG. 1d is a block diagram illustrating a system where the invention is part of the conference bridge/switch and part of the endpoint.

FIG. 5b is a graphical representation of the unity room.

Figure 1A:
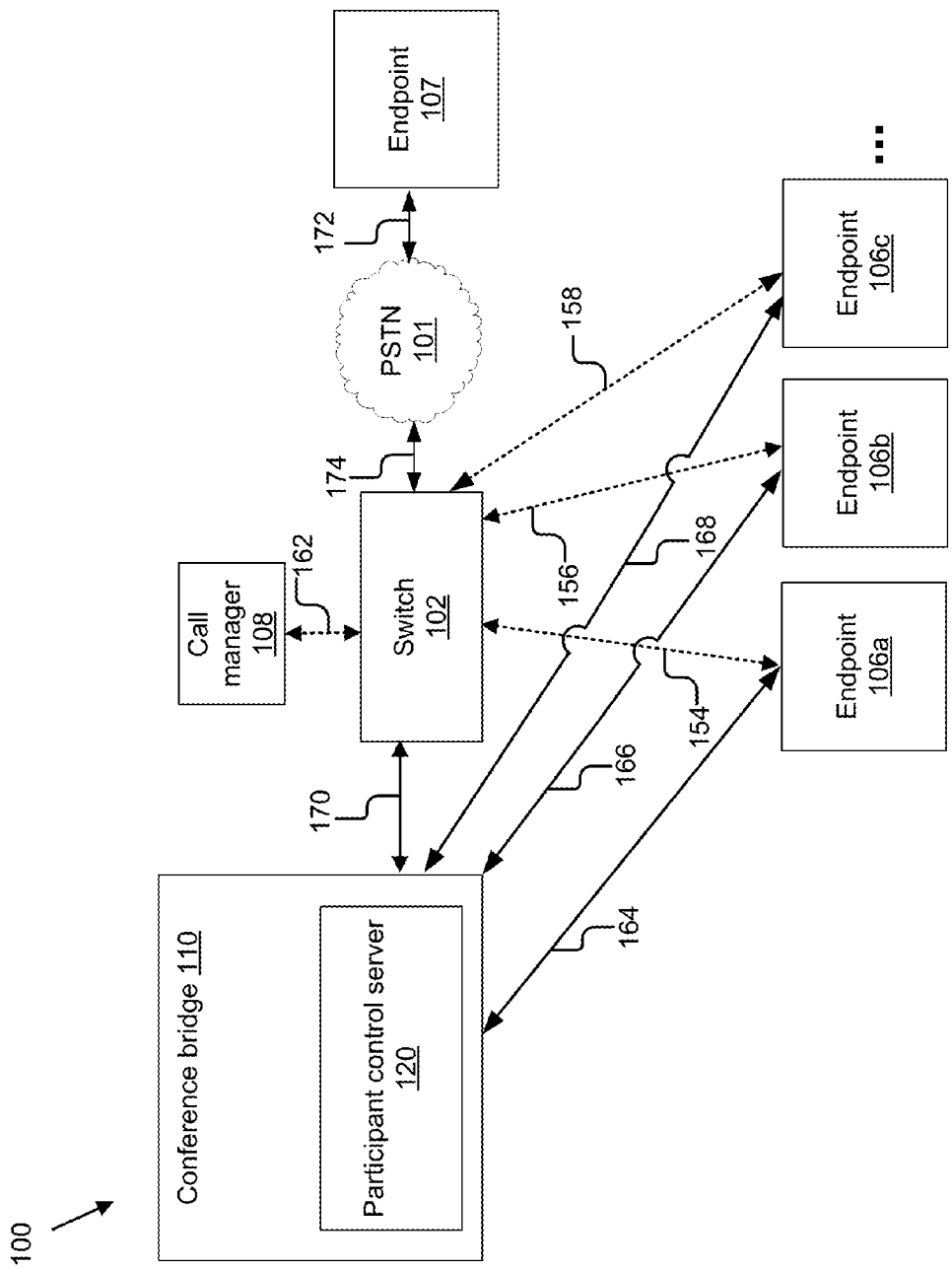
FIG. 1a is a block diagram illustrating a system where the participant control server is operable from or part of the conference bridge.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A system and method for individually managing video, audio and web conference data is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to user interfaces and particular hardware. However, the present invention applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

FIG. 1a is a block diagram illustrating a conference system 100 that comprises a conference bridge 110, a participant control server or system 120, a switch 102, a call manager 108 and endpoints 106a-c. In one embodiment, the conference bridge 110 and switch 102 do not exist as separate physical entities in conference system 100. Instead, the two entities exist as one combined entity that performs the functions of the conference bridge 110 and the switch 102. Similarly, in some embodiments, other illustrated entities exist as a combined physical entity or a single illustrated entity is separated into more than one physical entity.

The conference bridge 110 hosts conference calls and stores information for various conference calls. In this embodiment, the conference bridge 110 includes the participant control server 120. The participant control server 120 is responsible for managing the video, audio and web conference data for one or more participants. The participant control server 120 is described in greater detail below with reference to FIG. 2.

The conference bridge 110 is communicatively coupled to switch 102 through communication bus 170 and to endpoints 106a-b through communication buses 164-168. A communication bus is a communication channel used in the art to exchange electronic signals. The conference bridge 110 transmits and receives call signals over various communication buses 164-168, to and from various other entities in the conference system 100 to set up and end the conference call as well as perform other call control functions.

In another embodiment, the conference bridge 110 receives media from various participating endpoints 106a-c, mixes the media and transmits the mixed media to participating endpoints 106a-c. In yet another embodiment, the conference bridge 110 stores information about endpoints 106a-c participating in a conference call being hosted by conference bridge 110. The information includes an identification associated with participating endpoints 106a-c and optionally stores authentication data associated with endpoints 106a-c.

The switch 102 is an electronic switch, a digital switch, a soft switch or any other switch used to route phone calls. In one embodiment, switch 102 receives the media data from various call participants, mixes the media data, and transmits the mixed data to call participants. The switch 102 is communicatively coupled to endpoints 106a-c through communication buses 154-158, to the conference bridge 110 through communications bus 170.

The call manager 108 is typically a client application that manages a user's calls and supports various communication features associated with the user's call. For example, the call manager 108 supports one or more of the following features: visual presentation, voicemail, instant messaging, presence and managing user settings. The call manager 108 displays a user interface and the user can access one or more supported features from the user interface of the call manager 108. For example, the call manager 108 receives from switch 102 a link for a visual presentation associated with a call. The call manager 108 displays the link to the user and displays the visual presentation in response to the user selecting the link.

In one embodiment, the call manager 108 is a client application stored in memory and executed by a processor. In another embodiment, the call manager 108 is part of endpoints 106a-c. In another embodiment, the call manager 108 is a web application that runs in the browser. In yet another embodiment, call manager 108 is a physical entity separate from endpoints 106a-c. Although the call manager 108 is illustrated as being stored only on endpoint 106a, persons of ordinary skill in the art will recognize that in one embodiment, a separate call manager 108 is stored on each endpoint 106a-c.

Endpoints 106a-c are devices that enable a user to carry on a phone call. Examples of endpoints include a video conferencing device, a multipoint control unit (MCU), an internet protocol (IP) phone, an analog phone, an analog terminal adapter (ATA), a computing device configured to execute the functionality of an endpoint 106a-c and any other device that originates and/or terminates a media stream.

Figure 1B:
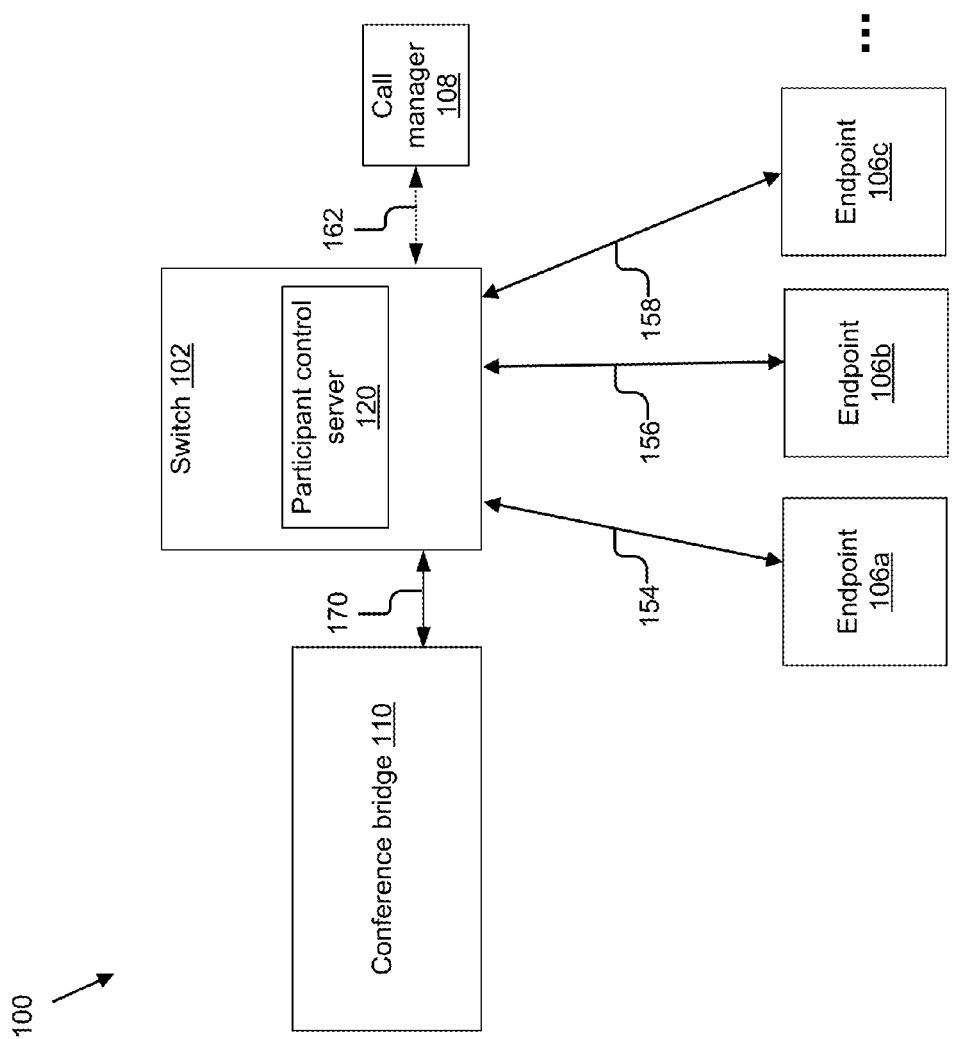
FIG. 1b is a block diagram illustrating a system where the participant control server is part of the switch.

FIG. 1b is a block diagram illustrating a conference system 100 that comprises a conference bridge 110, a switch 102, a participant control server 120, a call manager 108 and endpoints 106a-c. In this embodiment, the participant control server 120 is operable from and part of the switch 102. The switch 102 transmits conference data to an endpoint 106a-c through communication buses 154-158.

Figure 1C:
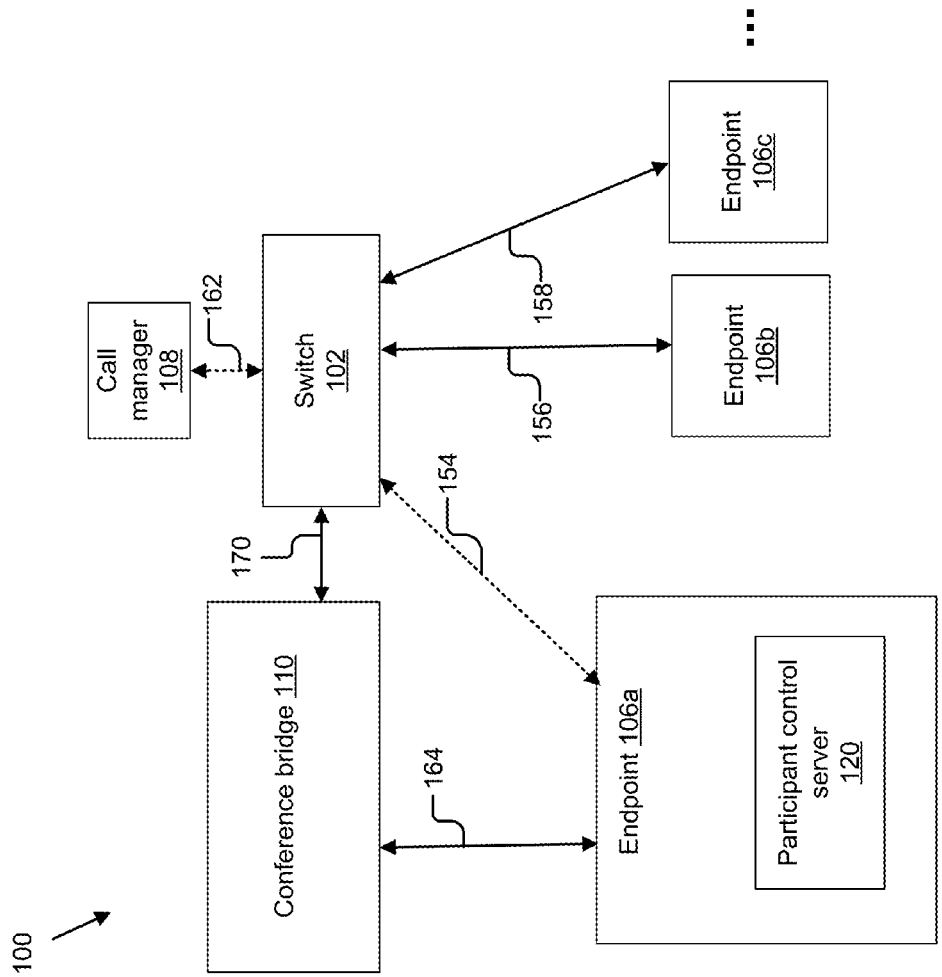
FIG. 1c is a block diagram illustrating a system where the participant control server is part of an endpoint.

FIG. 1c is a block diagram illustrating a conference system 100 that comprises a conference bridge 110, a call manager 108, a switch 102 and endpoint 106a-c. In this embodiment, a participant control server 120 is operable from and part of the endpoint 106a. The endpoint 106a receives communication data from either the conference bridge 110 or the switch 102. The other endpoints 106b, 106c are coupled to the switch 102 and can participate in the conference call provided by the conference bridge 110 and have individual control of the conference call data and functionality through use of and interaction with the participant control server 120.

FIG. 1d is a block diagram illustrating a conference system 100 that comprises a conference bridge 110, a switch 102, a call manager 108 and an endpoint 106a. In this embodiment, the participant control server 120 components are distributed and operable as part of the conference bridge 110, switch 102 and the endpoint 106a. Specifically, a past presentation data store 213 is embedded in the conference bridge 110 and the switch 102. The endpoint 106a includes a recording module 203, a current presentation data store 205, a participant state manager 217 and a graphical user interface module 223. These modules are described in greater detail below with reference to FIG. 2. In another embodiment, the past presentation data store 213 is external to the conference bridge 100 and the switch 102. For example, the past presentation data store 213 is part of a network attached server (NAS) or part of attached storage, such as a universal serial bus (USB) or compact flash.

From a review of FIGS. 1a-1d, those skilled in the art will recognize that the present invention may be included in various components of an IP telephony system or may be distributed among different components of an IP telephony system.

Participant Control Server 120

Figure 2:
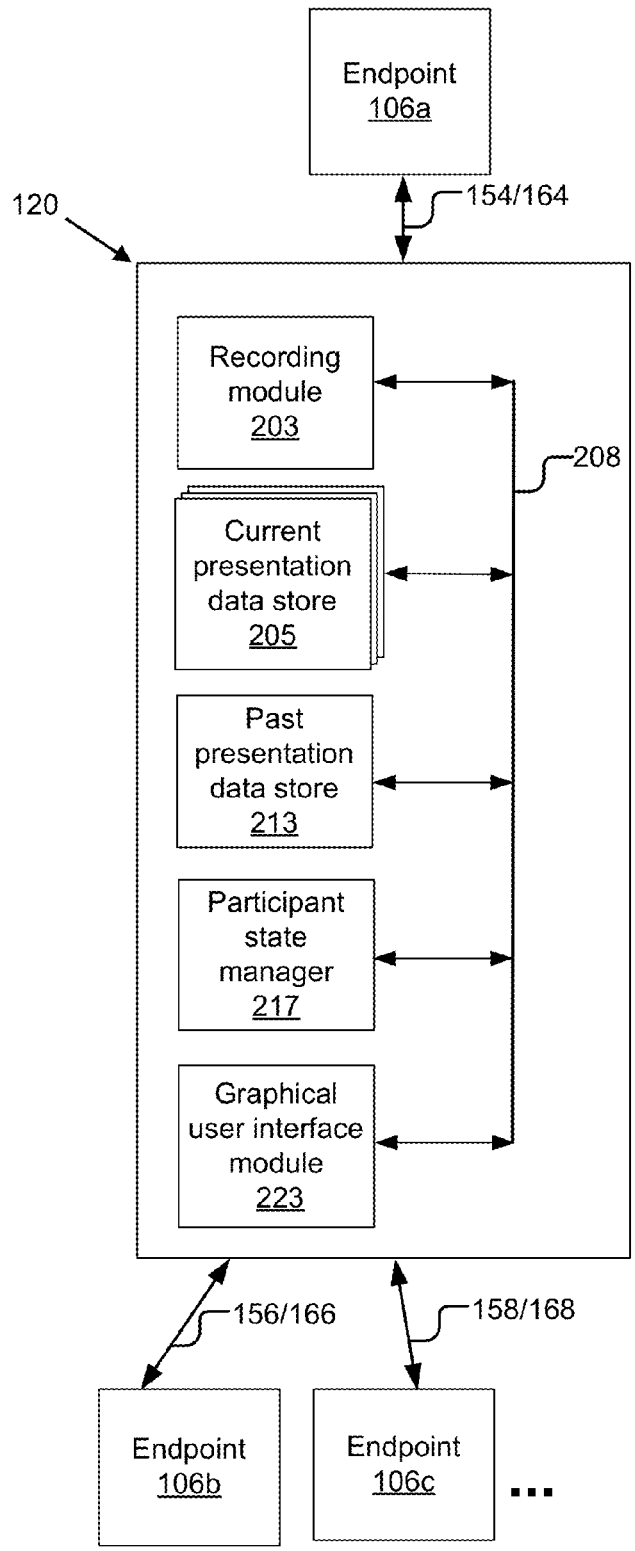
FIG. 2 is a block diagram of the participant control server in more detail.

FIG. 2 is a block diagram illustrating a participant control server 120 in more detail. A presenter begins the conference and it is assumed that the presenter is operating from endpoint 106a. However, those skilled in the art will recognize that any one of the endpoints 106a-c could be used by the presenter, and the use of endpoint 106a is merely by way of example. Endpoint 106a receives the video, audio and presentation conference data and transmits the conference data to the participant control server 120 via communication bus 154 or 164. In one embodiment, the participant control server 120 comprises a recording module 203, a current presentation data store 205, a past presentation data store 213, a participant state manager 217 and a graphical user interface module 223 that are communicatively coupled to a bus 208. The conference data is transmitted to endpoints 106a-c through communications buses 154/164, 156/166 and 158/168 depending upon whether the participant control server 120 is stored on the conference bridge 110 or the switch 102.

In one embodiment, the recording module 203 is software and routines operable on a processor for recording of conference data. The recording module 203 stores conference data in the current presentation data store 205 while the conference is active. In one embodiment, each type of conference data is stored in a separate data store. For example, all the audio, video, web and instant messaging data are stored in separate current presentation data stores 205. In another embodiment, the conference data is further divided for each participant. For example, the presenter's audio conference data is stored as a separate track from a participant's audio conference data. In another embodiment, all the presenter conference data is saved together so that a participant reviews the audio, video and web conference data for only the presenter at the same time.

The conference data is saved to a buffer or as a file or multiple files on the current presentation data store 205. Once a conference is complete, the recording module 203 transfers the conference data from the current presentation data store 205 to the past presentation data store 213. In one embodiment, the past presentation data store 213 also comprises multiple data stores for each type of conference data. The recording module 203 also controls any annotations that are added to the conference data by the participants. In another embodiment, the current presentation store 205 is a limited size circular buffer and the recording module 203 transfers the oldest parts of the conference data from the current presentation store 205 to the past presentation data store 213 as the circular buffer stores a predefined level of information, regardless of whether the conference is active or completed. The current presentation data store 205 and the past presentation data store 213 are conventional types of data storage devices such as but not limited to random access memory, flash memory, hard disk, optical disk or any other type of storage media capable of receiving, storing and outputting data.

In one embodiment of the invention, the participant control server includes other forms of collaboration, such as instant messaging. The instant messaging session is recorded and stored as a separate file or in association with one of the other types of conference data.

The participant state manager 217 provides users with functionality for pause, forward, fast-forwarding, rewinding, fast-rewinding of conference data and moving to a particular place by selecting an annotation. More specifically, the participant state manager 217 tracks the write pointers to write conference data to the file or buffer in the current presentation data store 205. Each type of conference data has its own set of write pointers that are stored in a separate buffer. The participant state manager 217 is coupled for communication with the endpoints to receive control signals necessary for maintaining the state of presentation of material to the endpoints. The participant state manager 217 maintains read pointers and state information for each participant. When the conference participants are listening and/or watching the presentation, the participant read pointers point to the respective locations in the file or buffer at which each participant is listening to and/or watching the presentation. The participant state manager 217 also maintains information about the type of the interface being displayed and in use by each respective the endpoint 106*a-c*. Example user interfaces are described in more detail below with reference to FIGS. 5*a*-7*f*.

If a participant wants to rewind to an earlier part of the presentation, the participant state manager 217 adjusts the participant read pointer and state information accordingly for that participant without affecting the conference data provided to the presenter and the other conference participants. The individual participant read pointers and the state information also support pause, fast-rewind, forward and fast-forward functionality. The participant state manager also adjusts the participant read pointer and state information to play the conference data associated with a selected annotation.

In one embodiment, if a participant wants to view a different part of the audio, the participant state manager 217 instructs the participant control server 120 to stop transmitting the real-time conference audio and start transmitting the recorded conference audio. The read pointers (also known as file offsets) are adjusted depending on whether the participant wants to go backward or forward. When the participant wants to go back to listening to the real-time conference audio, the participant state manager 217 instructs the participant control server 120 to stop transmitting the recorded conference audio and go back to transmitting the real-time conference audio.

The graphical user interface (GUI) module 223 is software and routines operable on a processor to display video, output audio and output presentation conference data for the real-time presentation and the recorded conference data. In one embodiment, the GUI module 223 displays separate players for the real-time presentation and the recorded conference data. In another embodiment, a single player displays both the real-time presentation data and the recorded conference data. The GUI module 223 provides the user with a mechanism for selecting a time period for displaying the conference, such as a slide bar. Examples of different GUIs are illustrated in FIGS. 7*a-f*.

Current Presentation Data Store 205

Figure 3A:
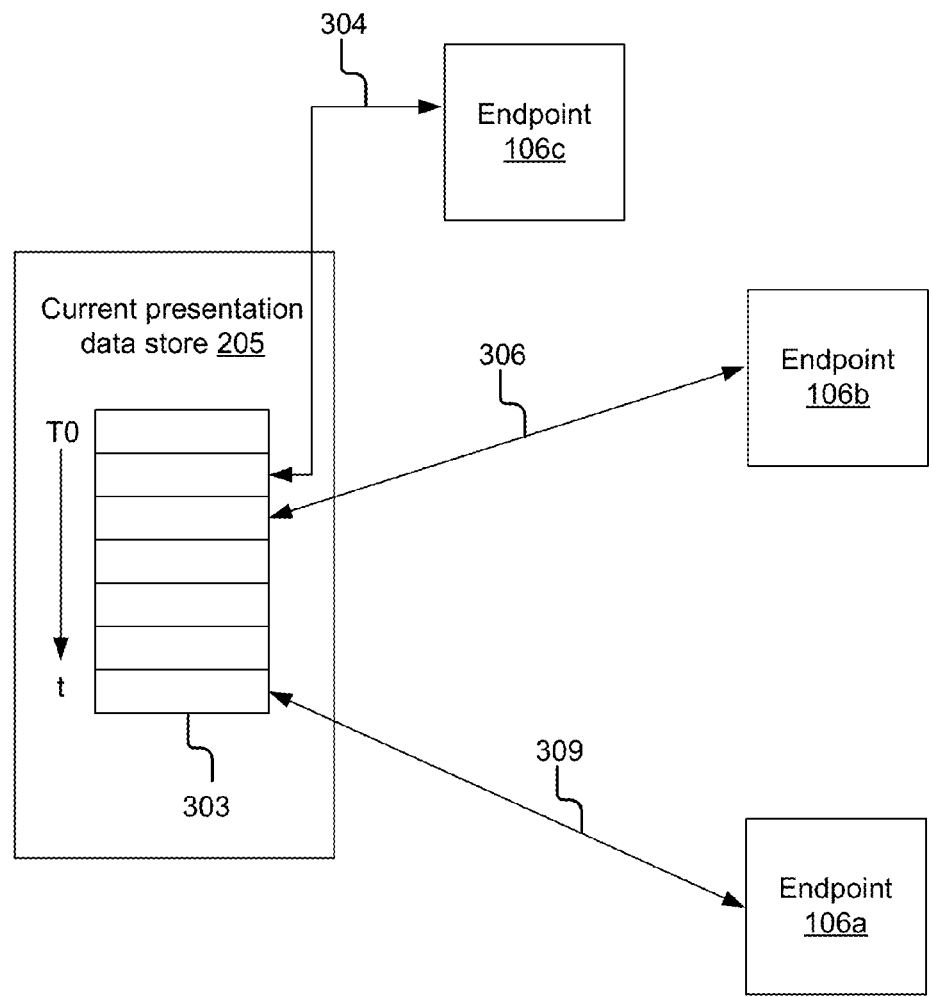
FIG. 3a is a block diagram of the current presentation data store in more detail.

FIG. 3*a* is a block diagram illustrating one embodiment of the current presentation data store 205. The current presentation data store 205 contains a buffer or file 303 for each type of recorded conference data. For example, in one embodiment, the audio, video and web conference data are stored in separate buffers. In this example, the presenter uses endpoint 106*a* to transmit conference data. The conference begins at T=0. Participants join the conference at later times using endpoints 106*b* and 106*c*.

In addition to receiving real-time data, the presenter and other participants can position to an annotation, rewind, fast-forward or pause the conference data. The location for the participant's conference viewing is tracked with read pointers and state information. At the beginning, the read pointers for all participants start at the same place. When a participant selects a different point in time, the participant state manager 217 adjusts the position of the read pointers to reflect the point in the presentation where the participant wants to view or hear the conference data. This time is designated with a read pointer that is maintained by the participant state manager 217. In FIG. 3*a*, all three endpoints 106*c*, 106*b* and 106*a* have different read pointers 304, 306 and 309, respectively. These read pointers are associated with each type of conference data.

Figure 3B:
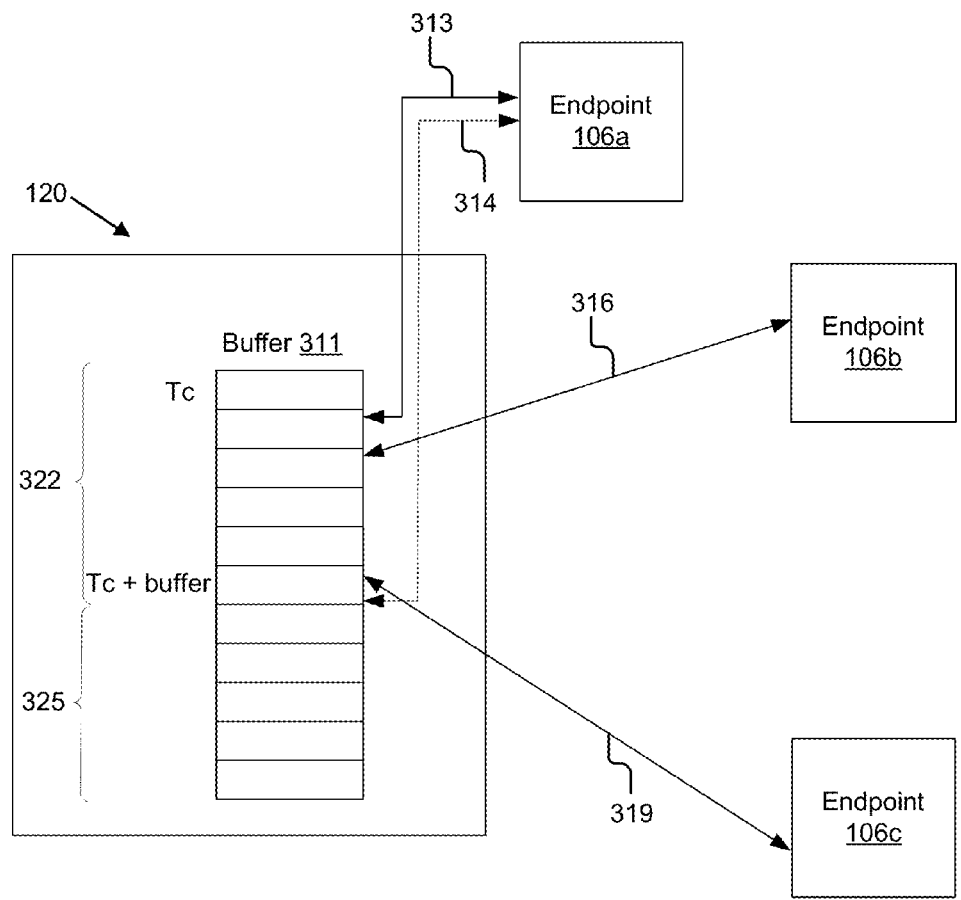
FIG. 3b is a block diagram of a buffer for storing presentation data according to one embodiment of the invention.

FIG. 3*b* is a block diagram illustrating another embodiment of the participant control server 120 for storing conference data. In this embodiment, a buffer 311 contains the current presentation 322 and the past presentations 325. The current presentation 322 is stored in a circular buffer. The circular buffer begins at time=the start of the conference (Tc) and ends at the start of the conference plus the size of the buffer (Tc+buffer). Once the presentation is complete or the circular buffer is nearly full, the recording module 203 transfers data from the current presentation 322 section of the buffer 311 to the past presentation 325 section of the buffer 311.

In one embodiment, the participant state manager 217 uses two different kinds of read pointers. The first read pointers 313, 316, 319 mark the point in the conference data where the participants are viewing or listening to the conference. The second read pointer 314 tracks the real-time progress for the conference data.

Multiple Sites

Transmitting both real-time conference data and recorded conference data demands more bandwidth than streaming real-time conference data alone. In some systems, the additional streams could require more bandwidth than has been allocated for a participant. To remedy this problem, either an additional server is added to each site or the system switches to a lower bandwidth codec.

Figure 4A:
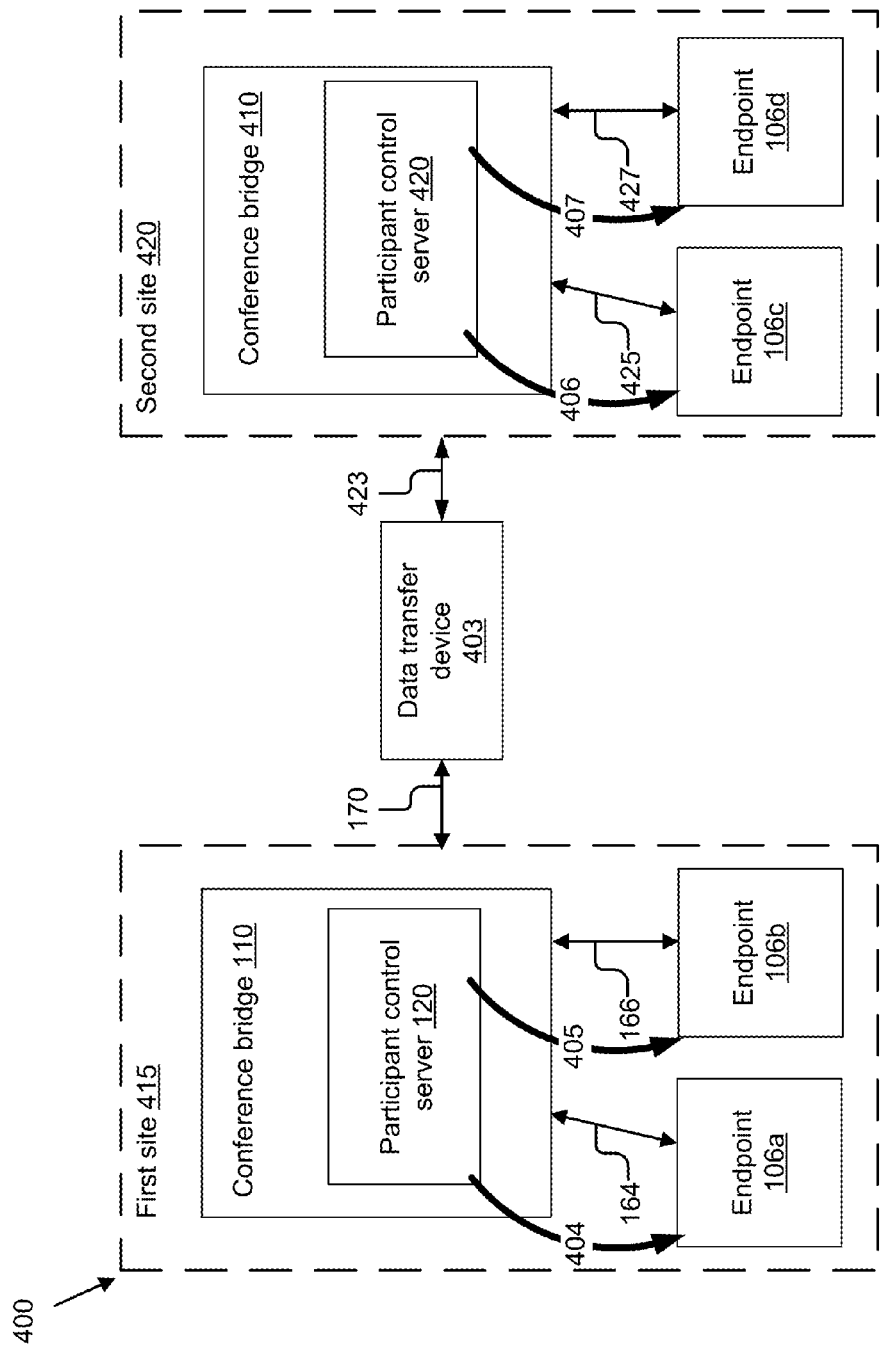
FIG. 4a is a block diagram illustrating a system where a participant control server is in multiple sites.

FIG. 4*a* is a block diagram illustrating one embodiment of the invention where the system 400 includes multiple sites 415, 420, each site 415, 420 having its own conference bridge 110, 410. In this embodiment the conference bridges 110, 410 are communicatively coupled to a data transfer device 403 through communication buses 170, 423. The data transfer device 403 is a single device or multiple devices. For example, the data transfer device 403 is a server, a switch, a router, multiple switches or multiple routers. The data transfer device 403 controls the flow of conference data between the first site 415 and the second site 420.

The conference bridges 110, 410 are communicatively coupled to endpoints 106*a*, 106*b* and 106*c*, 106*d* through communication buses 164, 166 and 425, 427, respectively. Each conference bridge 110, 410 comprises a participant control server 120, 420 for transmitting 404-407 the conference data to endpoints 106*a*, 106*b* and 106*c*, 106*d*. When a participant requests recorded conference data, the participant control server 120, 420 accesses a local cache, thereby avoiding an additional drain on wide-area network (WAN) bandwidth.

Figure 4B:
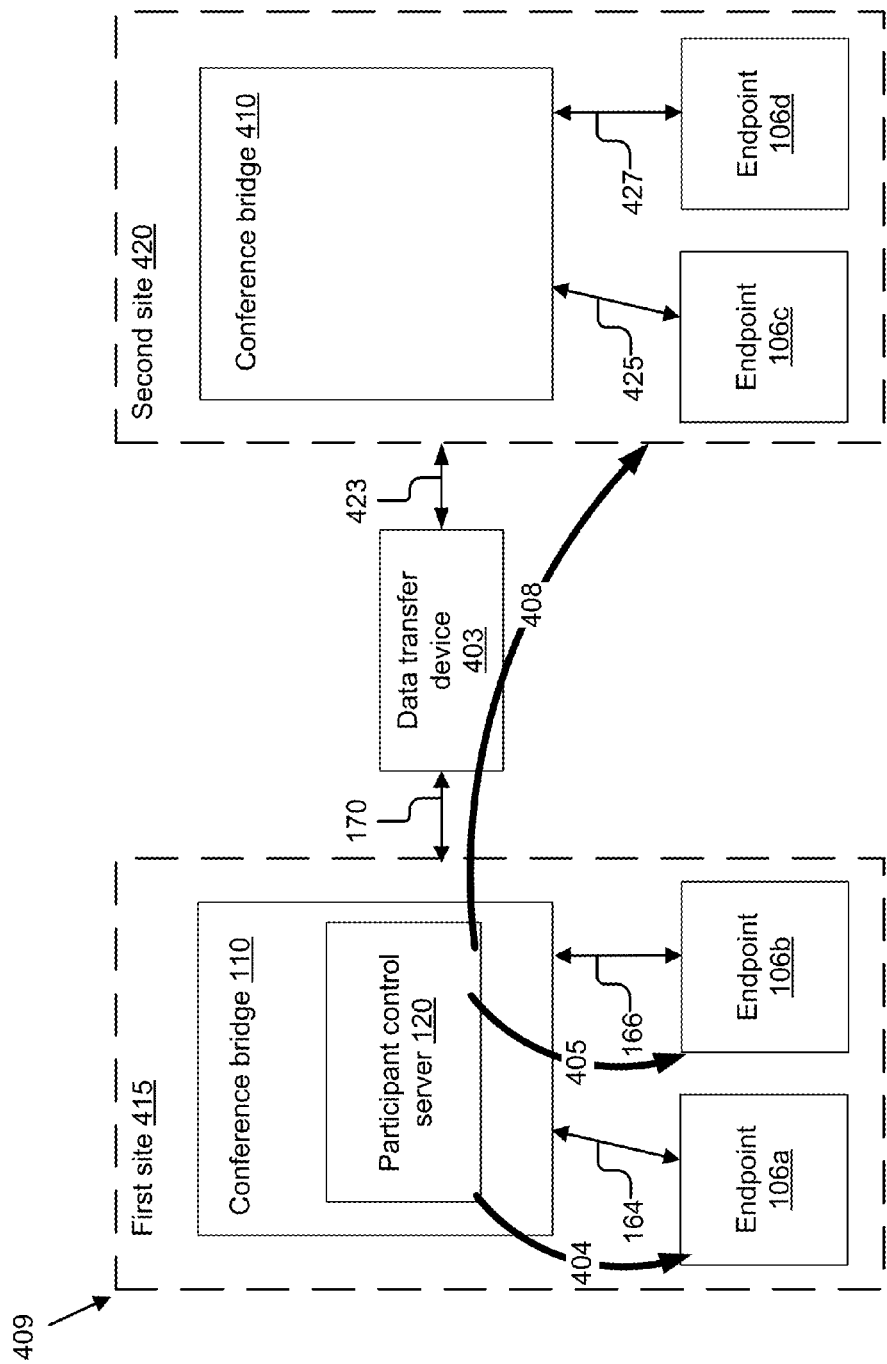
FIG. 4b is a block diagram illustrating a system where the participant control server at a first site transfers conference data to endpoints at a second site.

FIG. 4b illustrates a system 409 where the participant control server 120 resides in the first site 415. In this embodiment, the conference data is transmitted 408 from the participant control server 120 at the first site 415 to the data transfer device 403 over communication bus 170. The data transfer device 403 transmits the conference data to the second site 420 over communication bus 423. The conference bridge 410 stored on the second site 420 transmits the conference data to endpoints 106c and 106d over communications buses 425 and 427.

In one embodiment the participant control server 120 switches to a lower bandwidth codec that accommodates the additional stream without requiring any additional bandwidth beyond what has already been allocated. Lowering the bandwidth codec can lower the quality of the streams. In one embodiment, if a participant requests both real-time conference data and recorded conference data, the participant control server 420 lowers the quality of the real-time conference data. If the participant is viewing the recorded data, the participant may not even notice that the real-time conference data decreases in quality.

In another embodiment, the participant control server 120 transmits the stream with a different codec than was used for recording the conference, such as when a lower quality codec is used in order to minimize bandwidth usage. In such cases the participant control server 120 transforms the stream before transmission.

Figure 4C:
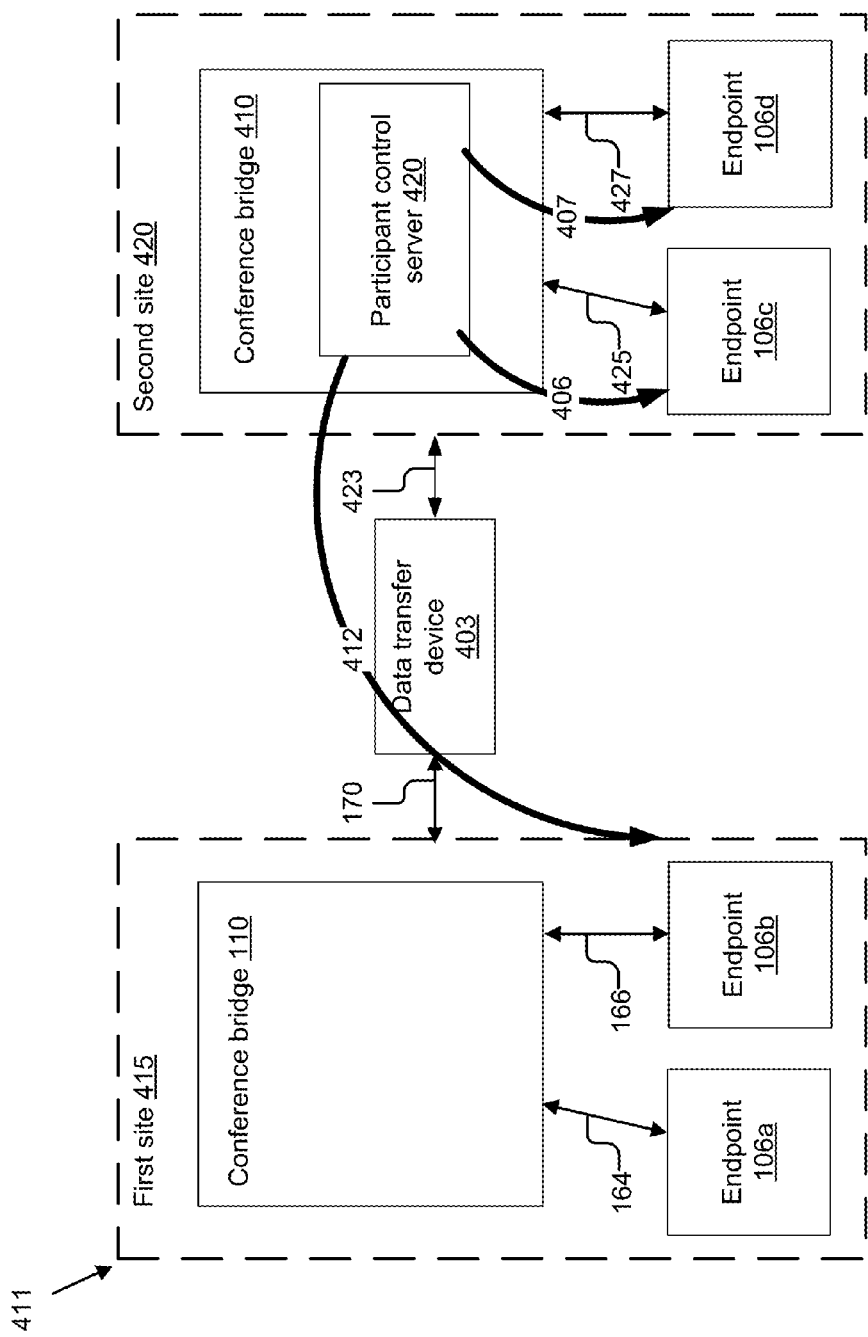
FIG. 4c is a block diagram illustrating a system where the participant control server at a second site transfers conference data to endpoints at a first site.

FIG. 4c illustrates a system 411 where the participant control server 120 resides in the second site 415. In this embodiment, the conference data is transmitted 412 from the participant control server 420 at the second site 420 to the data transfer device 403 over communication bus 423. The data transfer device 403 transmits the conference data to the first site 420 over communication bus 423. The conference bridge 110 stored on the first site 415 transmits the conference data to endpoints 106a and 106b over communications buses 164 and 166.

Figure 4D:
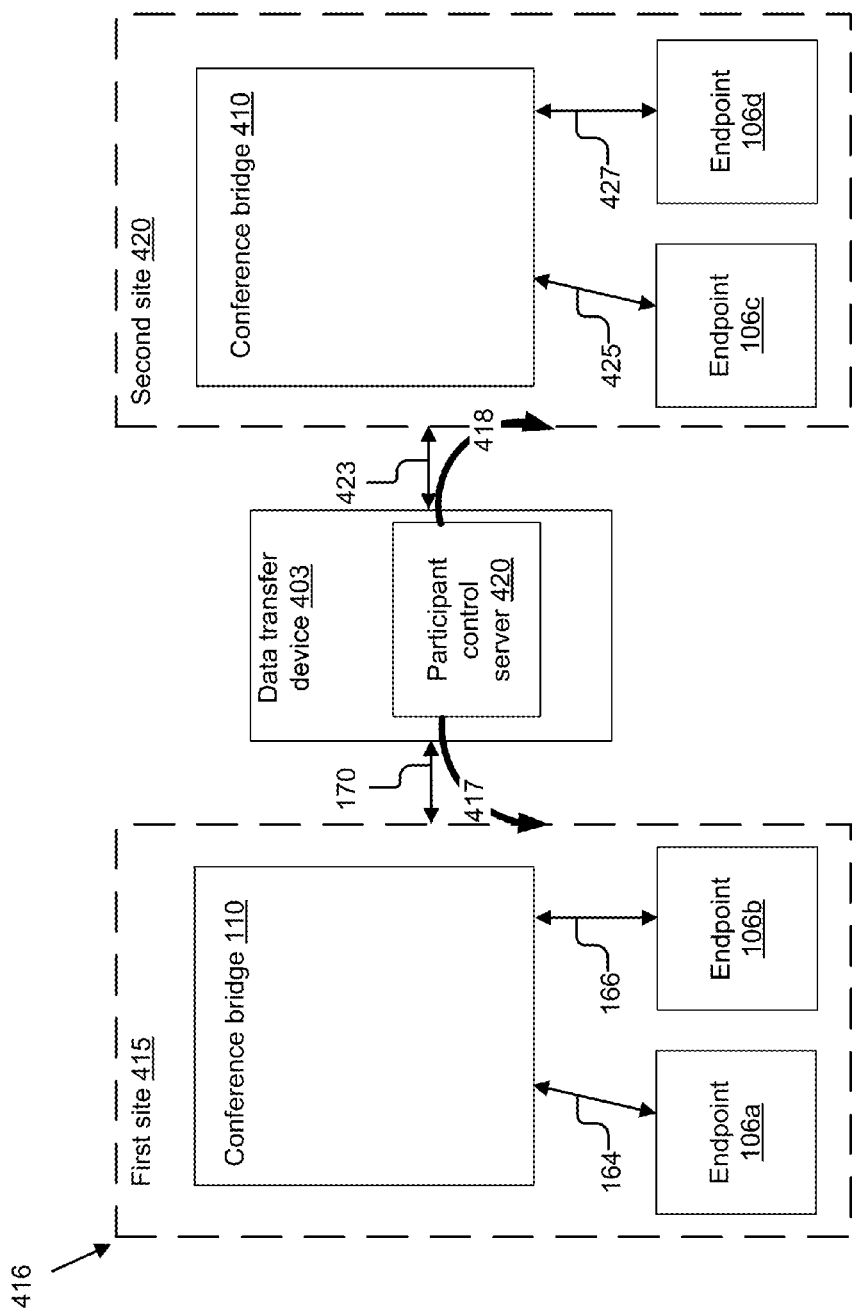
FIG. 4d is a block diagram illustrating a system where the participant control server is part of a data transfer device that transmits conference data to the first and second sites.

FIG. 4d illustrates a system 416 where the participant control server 120 resides on the data transfer device 403. The data transfer device 403 transmits 417, 418 the conference data to the first site 415 and the second site 420 over communications buses 170, 423. This system creates the greatest demand for WAN bandwidth because there is no local server for either site.

Ante Room 501 and Unity Room 511

Figure 5A:
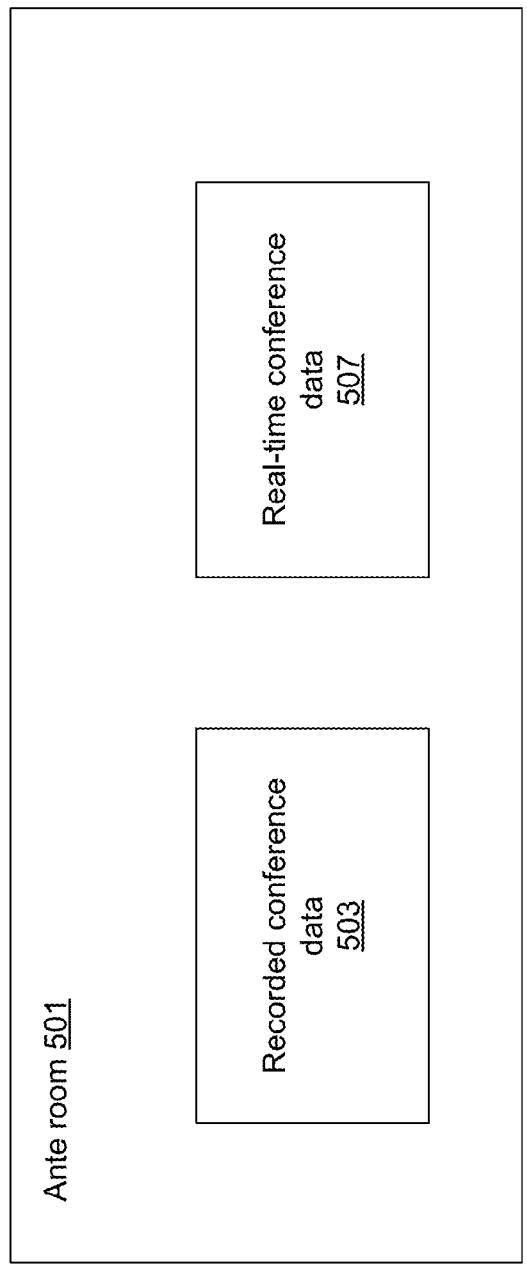
FIG. 5a is a graphical representation of the ante room.

When participants are late in joining a conference, they need some time to catch up on the conference information. If the participants join the conference, however, they are expected to begin participating. In one embodiment of the invention, participants have the option of joining an ante room where they can catch up. FIG. 5a is a graphical representation of a user interface for an ante room 501. In one embodiment, the participant control server 120 includes a module for creation, interaction and deletion of a data structure to provide the information for the ante room 501 and the unity room 511. The user interface module 223 interacts with this module to create the user interfaces shown in FIGS. 5a and 5b.

The ante room 501 displays both recorded conference data 503 and real-time conference data 507. Although the recorded conference data 503 and real-time conference data 507 are illustrated as being contained in separate GUIs, in one embodiment of the invention a single GUI displays both types of conference data. The GUI contains, for example, a button for toggling between the different types of conference data. Alternatively, the GUI contains a slider that is moved to display real-time conference data by moving the slider to the far right.

The participant views the recorded conference data 503 in preparation for joining the meeting. The user fast-forwards through the beginning of the meeting and slows down for sections that might be important. The pace of playback is controlled by clicking and dragging a slider or selecting a speed from a drop-down list. In one embodiment of the invention, the GUI includes annotations that signal locations in the conference where the participants should review the conference data.

In one embodiment, a signal is provided to participants that are in the conference to indicate that the user is in the ante room 501. Alternatively, the other participants are signaled to the user's presence when the user enters the unity room 511.

FIG. 5b is a graphical representation of a user interface for the unity room 511. Once the participant joins the unity room 511, the real-time conference 515 is activated and the participant is part of the conference. The recorded conference data 503 is still available, though, in case the user has not finished reviewing the conference data or needs to look at a particular slide. FIG. 5b illustrates a picture-in-picture scenario where the real-time conference 515 is displayed as a full screen and the recorded conference data 503 is displayed in a smaller screen so that the participant views both conference data simultaneously.

In some cases a participant may wish to review the recorded conference data 503 but needs to remain connected to the real-time conference 515. In one embodiment where the participant is using a phone headset, the phone headset plays the recorded conference data 503 while the speakers play the real-time conference 515. Alternatively, the participant reviews only one type of conference data, such as the presentation slides while being connected to the real-time audio conference data.

Graphical User Interfaces

Figure 6A:
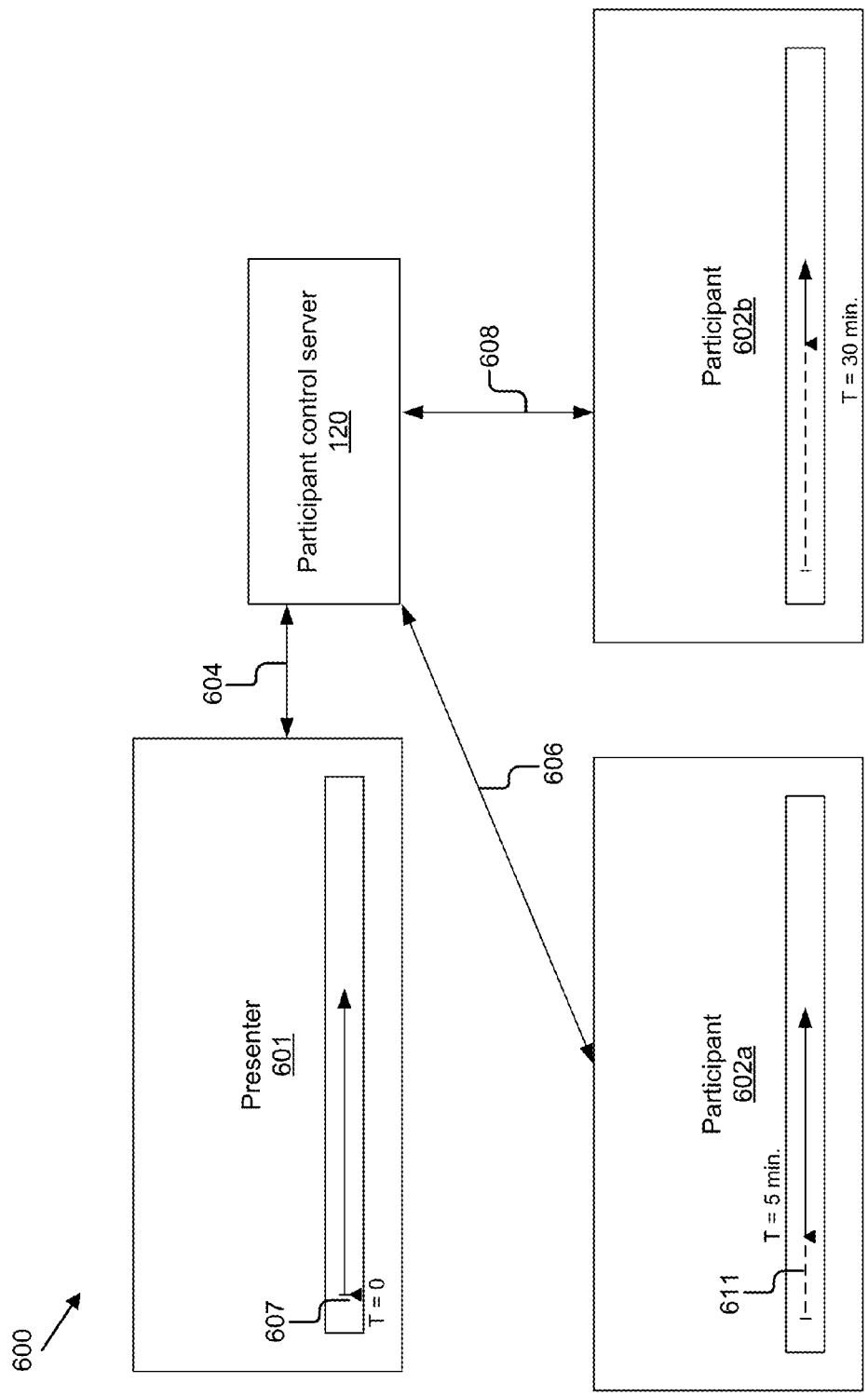
FIG. 6a is a block diagram illustrating multiple conference participants that join the conference at different times.

FIG. 6a is a block diagram that illustrates a system 600 with multiple conference participants that join the conference at different times. The presenter 601 joins the conference at time=0 as indicated by the time arrow 607 that begins at T=0. The presenter 601 transmits conference data to the participant control server 120 through communication bus 604. The participants receive three different types of media: audio, video and web conference data. Each type of media is separately controllable. In other embodiments, the participants receive two or more of the media types. Furthermore, those skilled in the art will recognize that there are other media types that may be provided by the participant control server 120 such as but not limited to instant messages and presence. Those skilled in the art will recognize that the present invention can be expanded to include any number of new types of media that might be presented to one or more participants in a conference call, and that a user may want to make selectively controllable by an individual user.

Participant 602a joins the conference after five minutes have elapsed as indicated by the triangle on the timeline and the label displayed as "T=5 Min." The dashed lines 611 indicate the location of data in the timeline where conference data is missing. The missing conference data and the real-time conference data are obtained from the participant control server 120 using communication bus 606. Participant 602b joins the conference after thirty minutes have elapsed as indicated by the triangle on the timeline and the label displayed as "T=30 Min." The conference data is obtained from the participant control server 120 through communications bus 608.

Figure 6B:
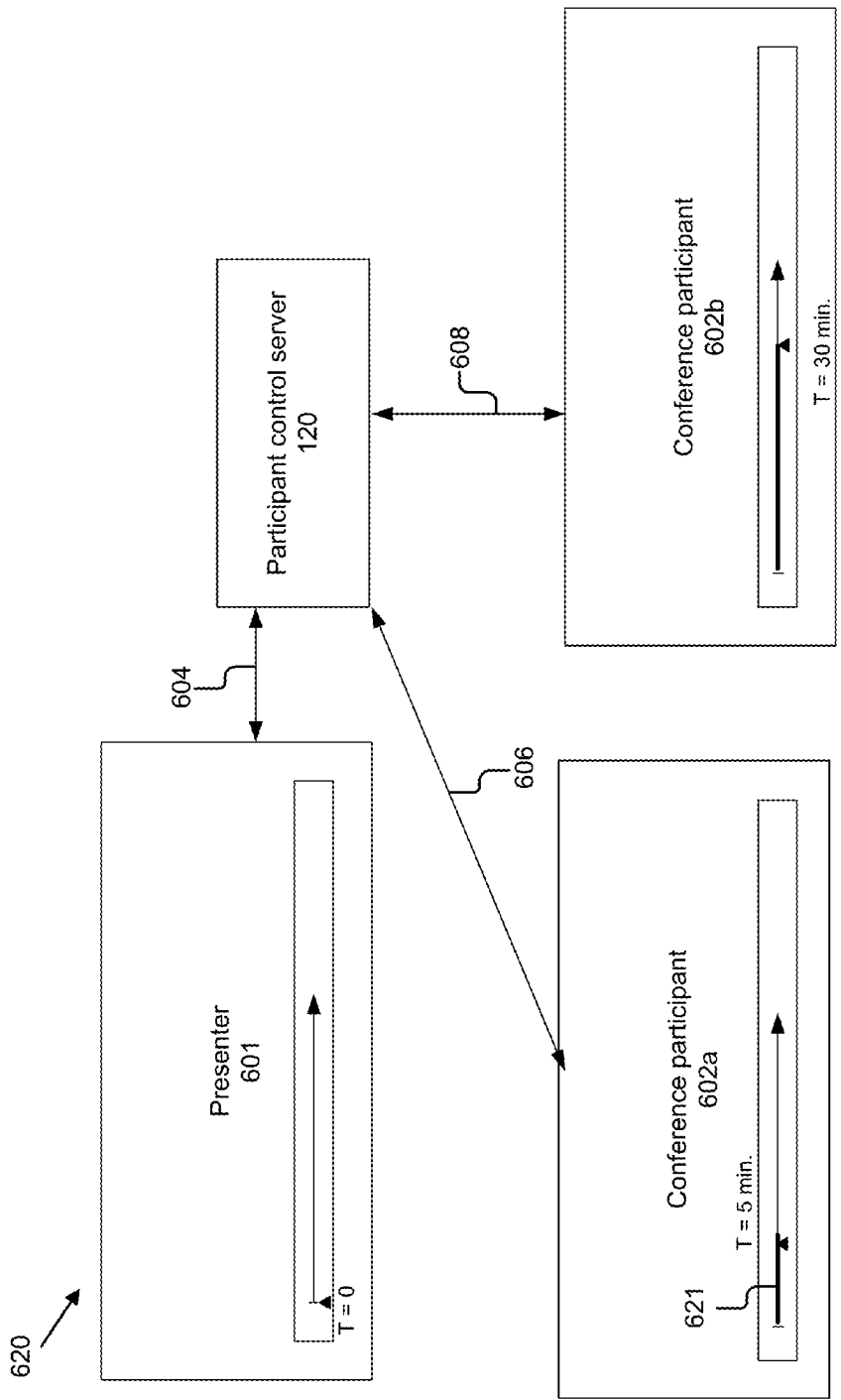
FIG. 6b is a block diagram illustrating multiple conference participants that have access to the recorded conference data.

FIG. 6b illustrates a system 620 where the missing conference data is accessible, for example in cases where the data was downloaded or stored in a cache. The user interfaces have been updated to reflect that the data is now accessible. The newly accessible portion of the conference data is indicated with a thick line 621 in the updated user interfaces.

Figure 7A:
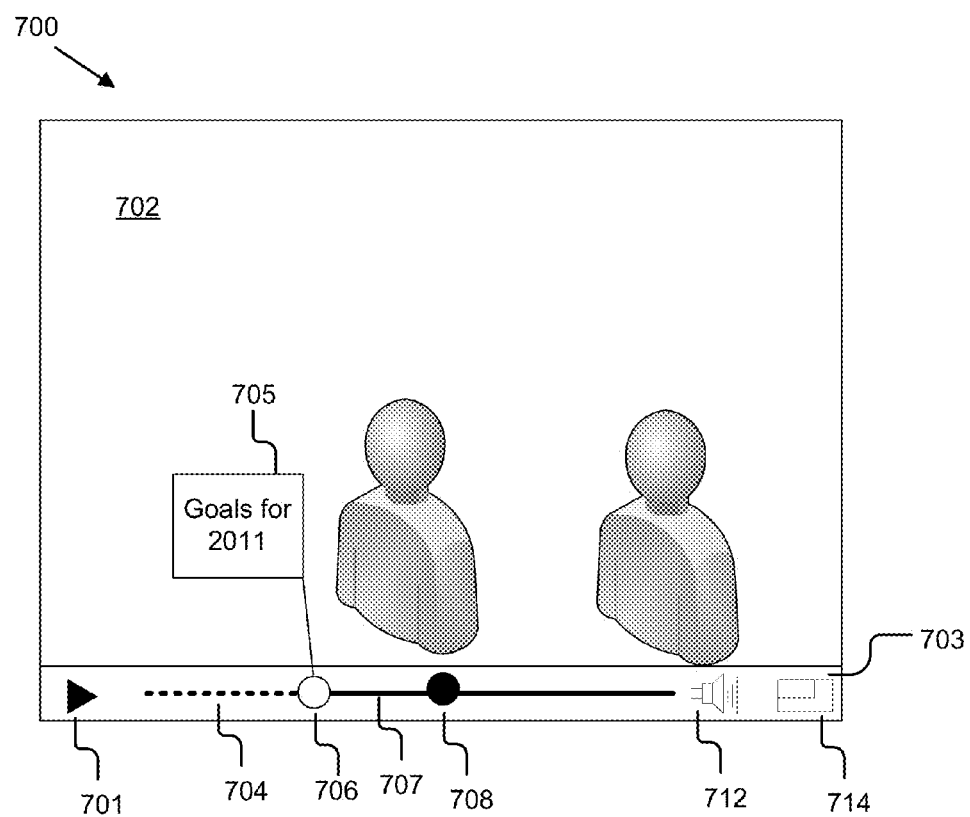
FIG. 7a is a graphical user interface of a display window and an associated audio control box.

FIG. 7a illustrates a graphic representation of a GUI 700 for viewing recorded video data. The screen area 702 displays other conference participants. The toolbar 703 includes a play/pause button 701, dashed lines 704 indicating that additional recorded data is being saved locally, an annotation 706, the timeline 707 for video conference data, a slide button 708 indicating the position of the playback, a volume control 712 for the audio and an icon 714 for maximizing the screen 702. When a participant clicks on the annotation 706, a pop-up box 705 reveals the annotation 706; in this case, the place in the video conference where participants discuss the goals for 2011. In one embodiment, the annotation pop-up box 705 also includes a control that allows the user to position the current replay to the point of the annotation. In another embodiment of the invention, the annotations 706 can also include participant notes. Each participant can take notes that are then attached to the conference data or all participants can contribute to the same document.

Figure 7B:
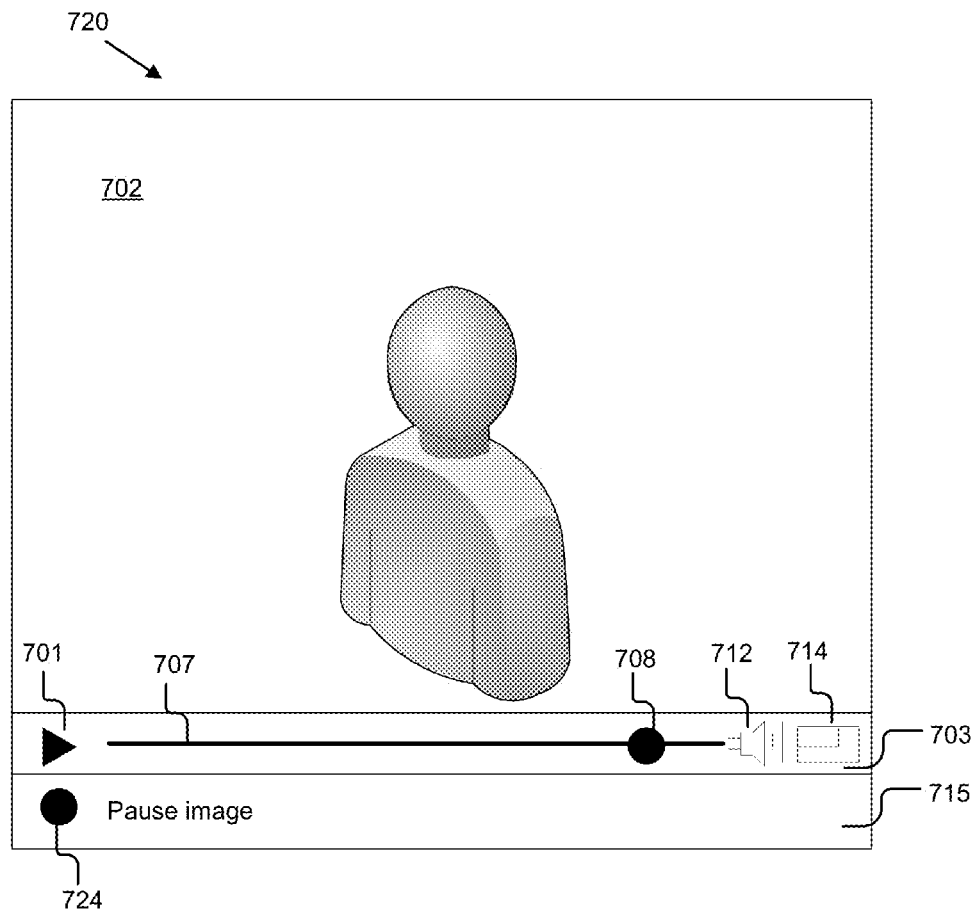
FIG. 7b is a graphical user interface of the display window, a real-time video display control box and an audio control box.

FIG. 7b illustrates a graphic representation of a GUI 720 for viewing real-time video data. The screen area 702 illustrates a real-time conference participant. The toolbar 703 includes a play/pause button 701, the timeline 707 for video conference data, a slide button 708 indicating the position of the video, a volume control 712 for the audio and an icon 714 for maximizing the screen. The GUI 720 also includes a second toolbar 715 including a pause image button 724 that allows the participant to pause the participant's image and mute the audio. That way the participant can take a break, for example by answering a phone call, but to the other participants it appears that the participant is still part of the conference. In another embodiment, the pause image button 724 causes the system to make a brief recording of the participant's video image and to play the video in a loop. That way, it is more difficult for the other conference participants to notice a change. In another embodiment, the GUI contains a presence icon (not shown) that indicates the participant's status. For example, the participant selects an unavailable icon to alert the other participants that he is temporarily unavailable.

Figure 7C:
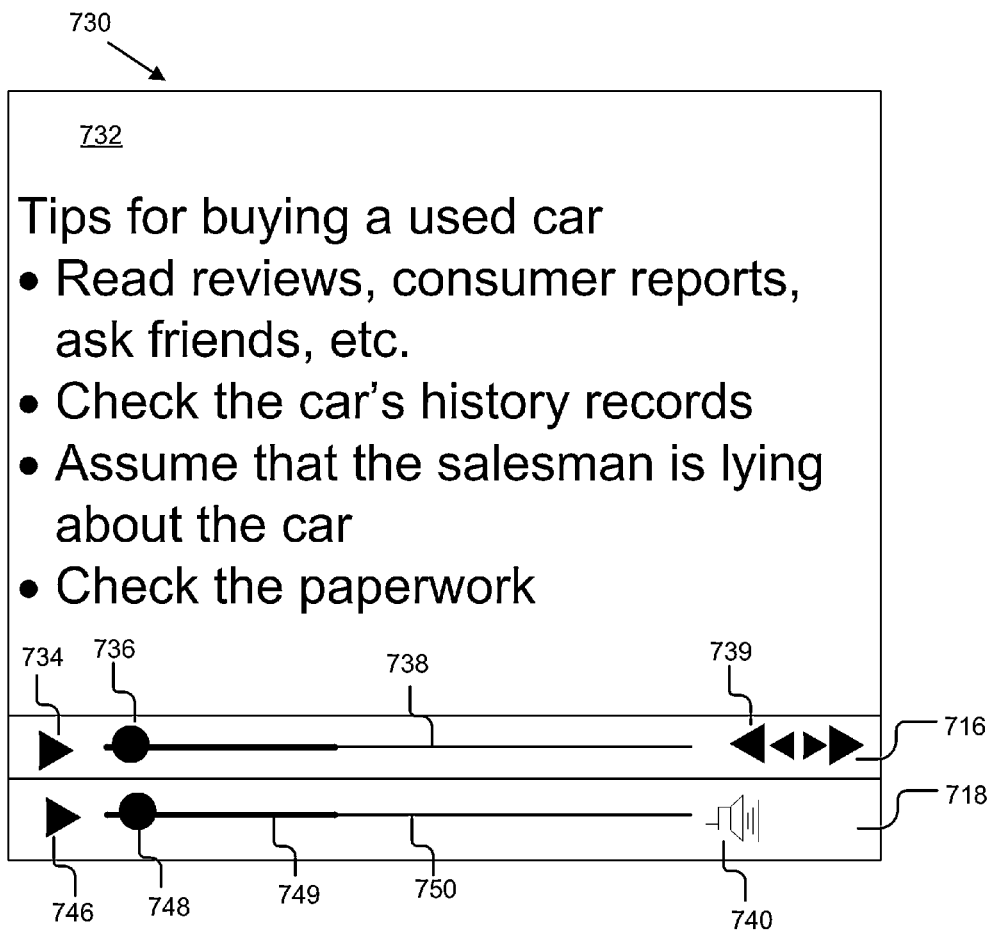
FIG. 7c is a graphical user interface of a display window showing recorded web data, an associated control box and an independent recorded audio control box.

FIG. 7c illustrates a graphic representation of a GUI 730 for controlling recorded web data and audio conference data. Web conference data includes, for example, presentation data such as a slide presentation using a commercially available presentation package such as PowerPoint by Microsoft Corp. of Redmond, Wash. The screen area 732 includes web conference data that is manipulated independent of the video conference data. The first toolbar 716 includes a play button 734 if the participant wants to view the slides as they were displayed during the conference. The slide button 736 allows the participant to view the slides at any time period along the timeline 738. The first toolbar 716 also includes icons 739 for fast-forwarding and rewinding through the slides. The icons include small arrows in the forward and backward directions for moving at a mild speed and larger arrows for moving at an accelerated playback speed, such as 1.5× or 2×. The second toolbar 718 includes icons for manipulating the recorded audio conference data. The arrow 746 is for playing the audio. The slider button 748 is for selecting the audio along the timeline 750. The thicker portion of the arrow 749 indicates where audio conference data was recently saved locally because the participant joined the conference at the thinner part of the timeline 750. Lastly, the speaker icon 740 allows the participant to adjust the volume.

Figure 7D:
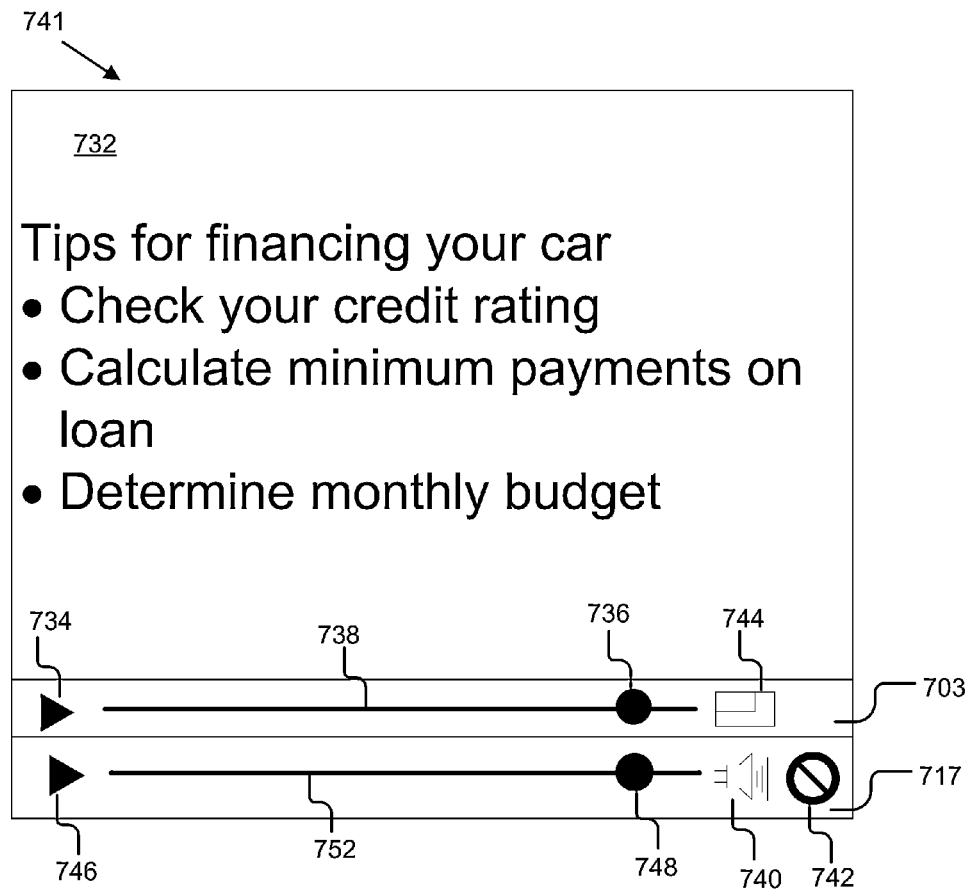
FIG. 7d is a graphical user interface of the window showing a real-time web conference data, an associated real-time audio control box and an independent recorded audio control box.

FIG. 7d illustrates a graphic representation of a GUI 741 for controlling real-time web and audio conference data. The screen 732 area displays the current slides. The first toolbar 703 includes an arrow 734 for playing the slides, a timeline 738, a slider 736 and an icon 744 for expanding the screen. The second toolbar 717 controls the real-time audio conference data. The arrow 746 plays the audio, the slider 748 button shows the location of the real-time audio on the timeline 752 and the volume icon 740 is for adjusting the volume. If the participant wants to take a break from the conference and take another phone call, the participant selects the mute icon 742 to mute the participant's audio. This works in conjunction with the pause image button 724 in FIG. 7b to give the appearance of still being an active participant in the conference while getting up, watching a movie or taking another phone call. Further details of this type of conference break can be found below under the header Ghost Hold.

Figure 7E:
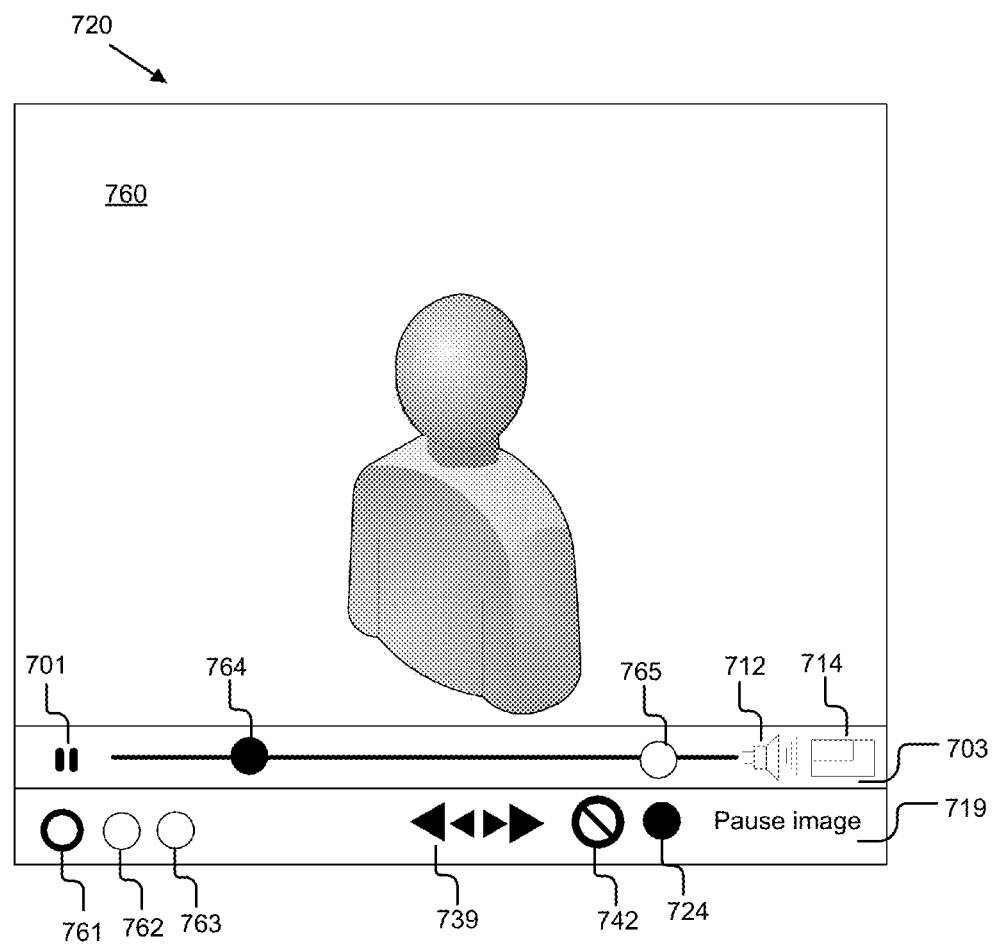
FIG. 7e is a graphical user interface of the control box for audio, a control box for video and a window for web conference data.

FIG. 7e illustrates a GUI 720 that includes buttons for selecting all three media types. The user selects the video icon 761, the web icon 762, and the audio icon 763 to control each type of media. In this figure, the video icon 761 is bolded to signify that video conference data is being displayed in the window 760. The first toolbar 703 plays both recorded conference data and real-time conference data. The solid slider 764 indicates the position of the video conference data. The presenter adjusts the solid slider 764 to a desired position for playback. The hollow slider 765 indicates the position of the real-time video data. The play/pause icon 701 is set to pause. The first toolbar 703 includes a volume icon 712 for adjusting the volume and an icon 714 for expanding the screen. The second toolbar 719 includes icons 739 for fast-forwarding and rewinding the recorded conference data. The participant mutes the audio with the mute icon 742 and pauses the participant's image with the pause image icon 724.

Figure 7F:
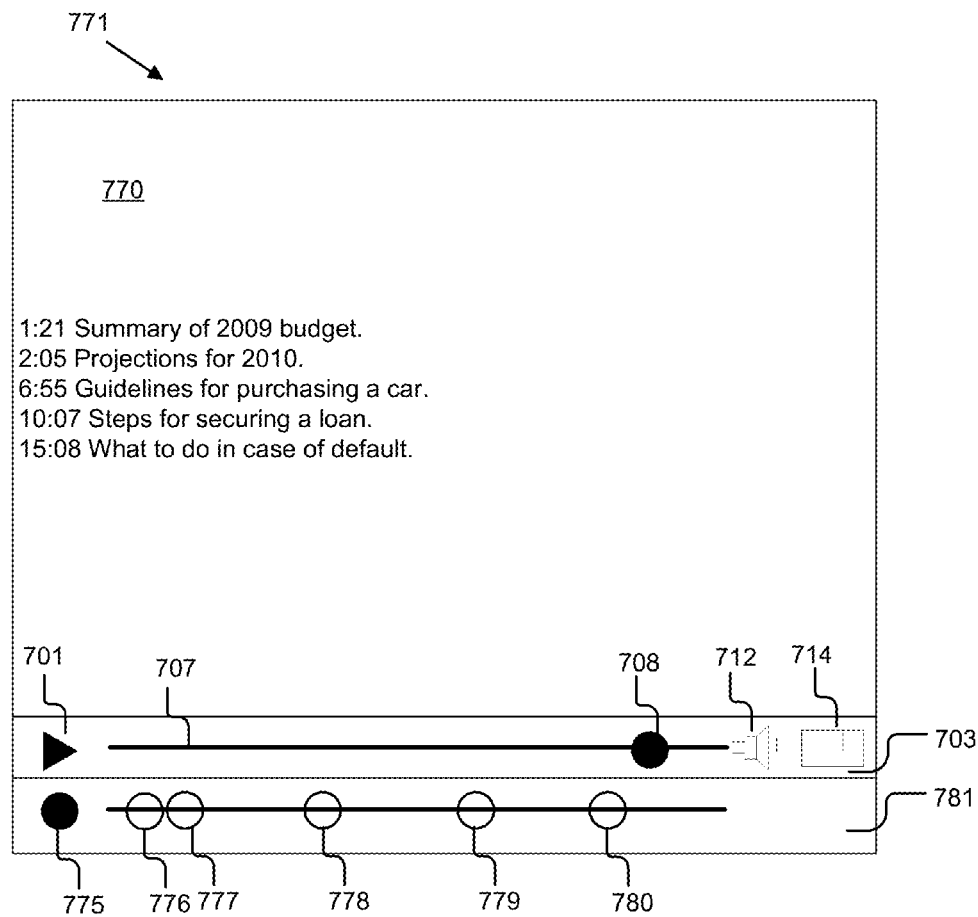
FIG. 7f is a graphical user interface of the window showing all user annotations.

FIG. 7f illustrates a GUI 771 for viewing all annotations. In one embodiment of the invention the user can select a button 775 from a separate toolbar 781 to see a list of annotations that have been made. In one embodiment, the annotations appear as a list in the window 770. In another embodiment, the annotations appear as buttons 776-780 on the timeline. The user selects a specific annotation to easily position the playback to that location either by clicking on an annotation in the window 770 or a specific button 776-780.

Those skilled in the art will recognize that the various combinations of the toolbars 703, 715, 716, 717, 718 and 719 shown in FIG. 7a-7f can be used together depending on the function of the GUI being presented. Those skilled in the art will also recognize that individual elements of the toolbars 703, 715, 716, 717, 718 and 719 may be combined in a variety of other ways depending on the types of media that are being individually controlled by the participant.

Ghost Hold

Conferences frequently take multiple hours. During that time, a user may want to put the conference on hold without alerting the other participants that the user is taking a break or answering another call. For example, during an introduction meeting between two companies, a user is not needed for the entire conference but still needs to half-listen to the conversation and be ready to participate. In a music-on-hold system, the other participants would be alerted to the user's treachery because music would begin playing on the line. As illustrated in FIG. 7e, the user can pause an image of the user and mute the user's microphone input to continue to give the appearance of participating in the conference.

If the user wants to make a second phone call, in conventional systems the user would pick up another phone. In this system, on the other hand, FIG. 1a illustrates that the user can use the same endpoint 106a to call a user at endpoint 107. The endpoint 106a uses the same switch 102 to access the public switching telephone network (PSTN) 101 to call a user at a different endpoint 107. In this example, the switch 102 is communicatively coupled 174 to the PSTN 101, which is communicatively coupled by signal line 172 to the endpoint 107. Once the secondary connection is established, the microphone input is used for the secondary connection.

Because the user is still listening to the conference, there are several ways to configure the two different audio streams. In one embodiment, the conference audio volume is lowered so that it is in the background. If the endpoint contains stereo speakers, one speaker outputs the audio conference and the other speaker outputs the audio from the secondary connection. If the user has a phone headset, in one embodiment the phone headset is dedicated to audio output for the secondary connection while the speakers output the audio for the conference.

When the user finishes the secondary connection or the conference ends, the user drops one of the connections and the system returns to a normal mode.

Sidebar

During a conference, some of the participants may wish to have side conversations. For example, the participants may wish to review and discuss part of the material that was previously presented by another participant. Alternatively, if the conference is an introduction between two different companies, some participants may wish to discuss the progress of the meeting and propose strategies that the other participants cannot see. In one embodiment of the invention, the participants establish a sidebar.

Figure 8:
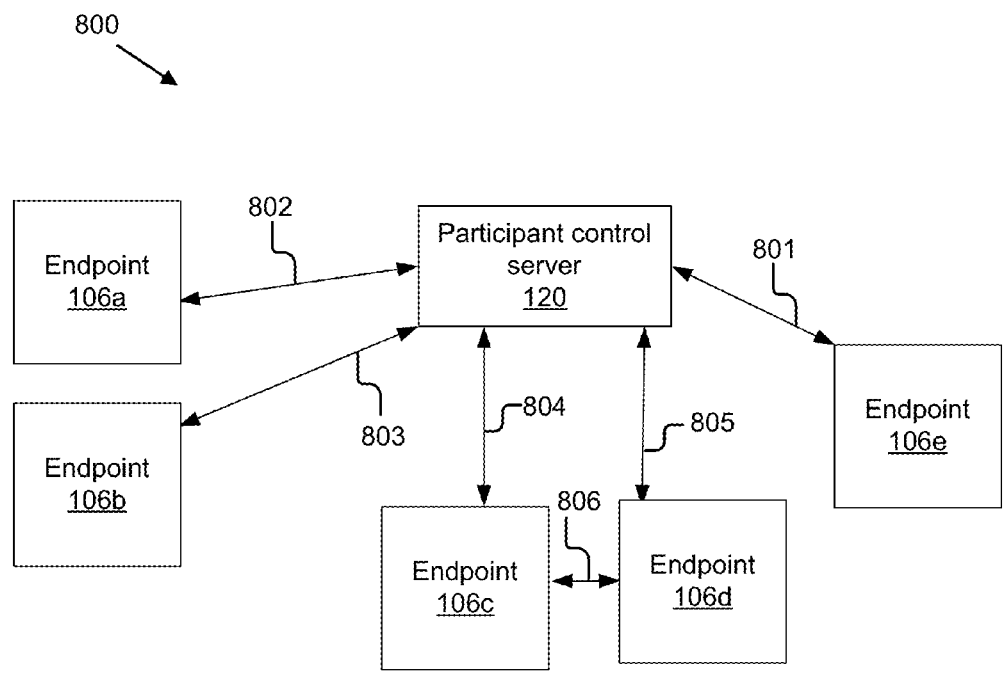
FIG. 8 is a block diagram illustrating endpoints receiving conference data from the participant control server and endpoints communicating separately from the conference.

FIG. 8 illustrates a system 800 for establishing a sidebar. The endpoints 106a-106e are communicatively coupled to the participant control server 120 through communication buses 801-805 to receive conference data. To establish a sidebar, in one embodiment the endpoints can communicate directly with each other, such as through the communicative coupling 806 illustrated between endpoints 106c and 106d. In another embodiment, the sidebar is established using the participant control server 120. The sidebar includes any form of communication, such as an instant messaging, a separate phone call, email or control over a portion of the conference data.

In one embodiment, the sidebar is used by the participants to collaborate in reviewing part of the conference. For example, a first participant establishes a sidebar and invites a second participant to listen to a section of the audio conference data. The first participant controls the point in the conference where the collaborative review takes place with the second participant.

Methods

Figure 9:
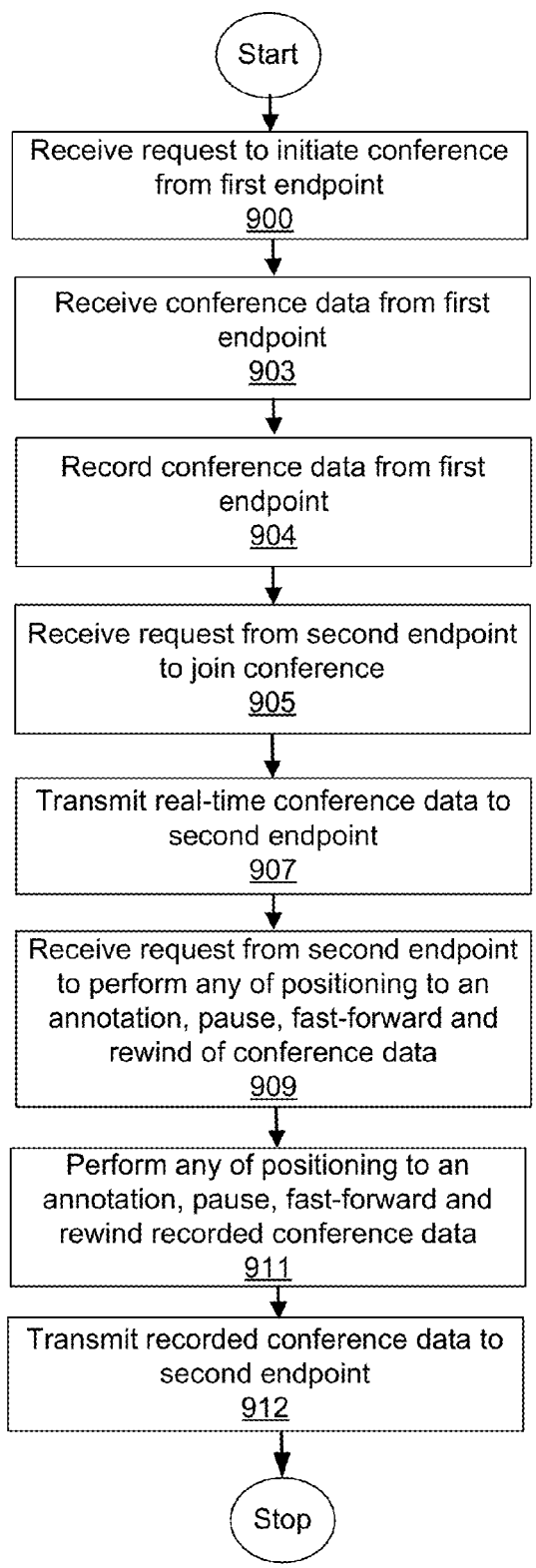
FIG. 9 is a flow diagram illustrating a method for transmitting real-time and recorded conference data to endpoints.

Referring now to FIGS. 9-12, various embodiments of the method of the present invention will be described. FIG. 9 is a flow chart illustrating steps for a participant to control recorded conference data. The participant control server 120 receives 900 a request to initiate a conference from a first endpoint 106a (the presenter). The participant control server 120 receives 903 conference data from the first endpoint 106a. The participant control server 120 records 904 conference data from the first endpoint 106a. The audio, video and web conference data are recorded separately so that the audio, video and web conference data are independently controllable; additionally, separate streams may be recorded for each participant for each media. In an alternate embodiment, the conference only includes one of the three types of media. The participant control server 120 receives 905 a request from a second endpoint 106b (participant) to join the conference. The participant control server 120 transmits 907 real-time conference data to the second endpoint 106b.

The participant control server 120 receives 909 a request from the second endpoint 106b to perform any of positioning to an annotation, pause, fast-forward and rewind of conference data. The participant control server 120 performs 911 a positioning to an annotation, pause, fast-forward and rewind of recorded conference data by redirecting the read pointers and status information from the real-time conference position to the position requested by the second endpoint 106b. The participant control server 120 transmits 912 recorded conference data to the second endpoint 106b that is responsive to the second endpoint's 106b request.

Figure 10:
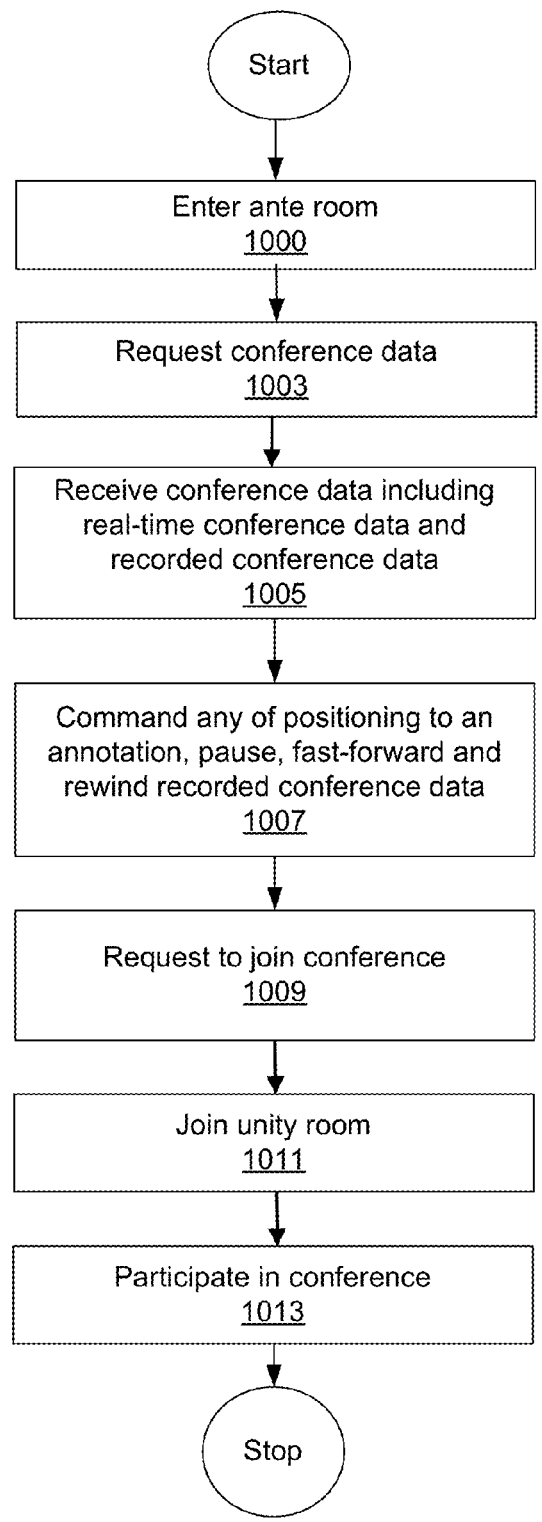
FIG. 10 is a flow diagram illustrating a method for a participant to catch-up on conference data in an ante room and then join the unity room to participate in the conference.

FIG. 10 is a flow chart illustrating steps for a participant to enter the ante room 501 before joining the conference in the unity room 511. A participant enters 1000 the ante room 501 and requests 1003 conference data. The participant receives 1005 conference data including real-time conference data and recorded conference data. The participant sends commands 1007 for any of positioning to an annotation, pause, fast-forward and rewind of the recorded conference data. These commands apply to audio, video and web conference data, which are independently controllable.

Once the participant is ready to participate in the conference, the participant requests 1009 to join the conference. The participant joins 1011 the unity room 511. The participant is now capable of participating 1013 in the conference. In the unity room 511, the participant can still view the recorded conference data and command any of positioning to an annotation, pause, fast-forward and rewind of the audio, video and web conference data.

Figure 11A:
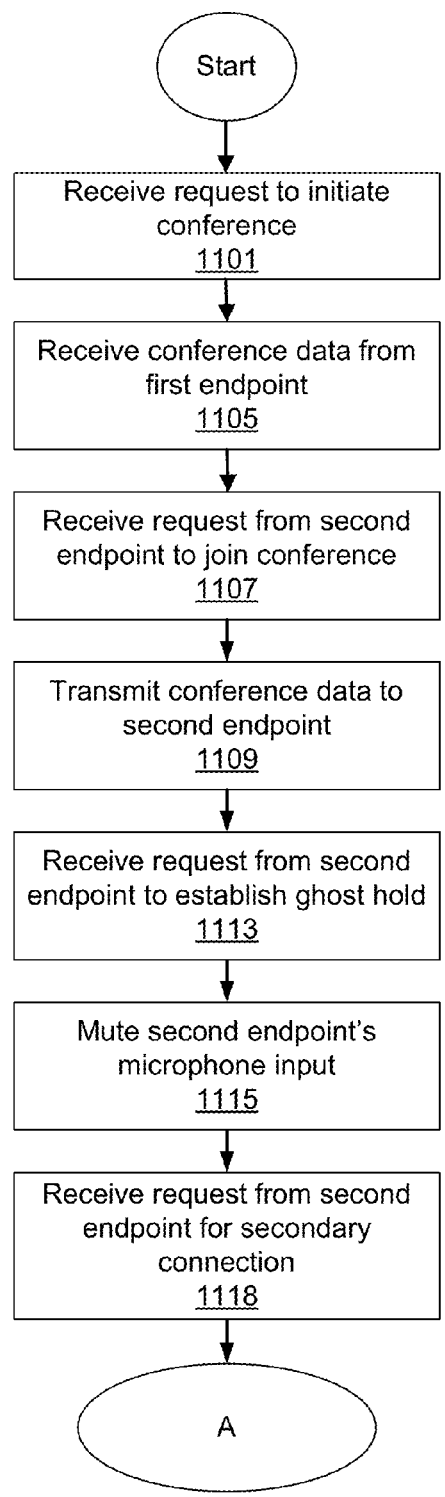
FIGS. 11a and 11b are flow diagrams illustrating a method for initiating a ghost hold.
Figure 11B:
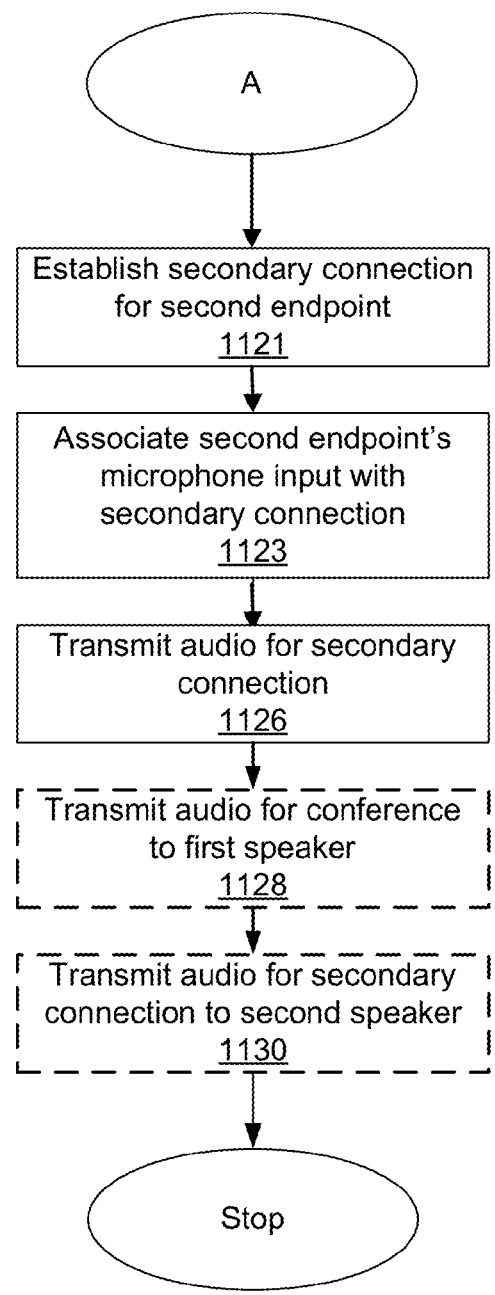

FIGS. 11a and 11b are a flow chart illustrating steps for establishing a ghost hold. The participant control server 120 receives 1101a request from a first endpoint 106a (presenter) to initiate a conference. The participant control server 120 initiates the conference. The participant control server 120 receives 1105 conference data from the first endpoint 106a. The participant control server 120 receives 1107 a request from a second endpoint 106b to join the conference. The participant control server 120 transmits 1109 conference data to the second endpoint 106b.

The participant control server 120 receives 1113 a request from the second endpoint 106b to establish a ghost hold. The ghost hold includes muting 1115 the second endpoint's 106b microphone input and (optionally) displaying a screen shot of the participant instead of displaying video of the participant.

The participant control server 120 receives 1118 a request from the second endpoint 106b to establish a secondary connection. The participant control server 120 establishes 1121 the secondary connection for the second endpoint 106b. The secondary connection includes, for example, calling another person. The participant control server 120 associates 1123 the second endpoint's 106b microphone input with the secondary connection. This way, the participant can use the same equipment for both the conference and, for example, a phone call instead of having to manage a phone in addition to the conference hardware. The participant control server 120 transmits 1126 the audio for the secondary connection.

If the second endpoint 106b includes multiple speakers, the participant control server 120 transmits 1128 audio for the conference to a first speaker and transmits 1130 audio for the secondary connection to the second speaker.

Figure 12:
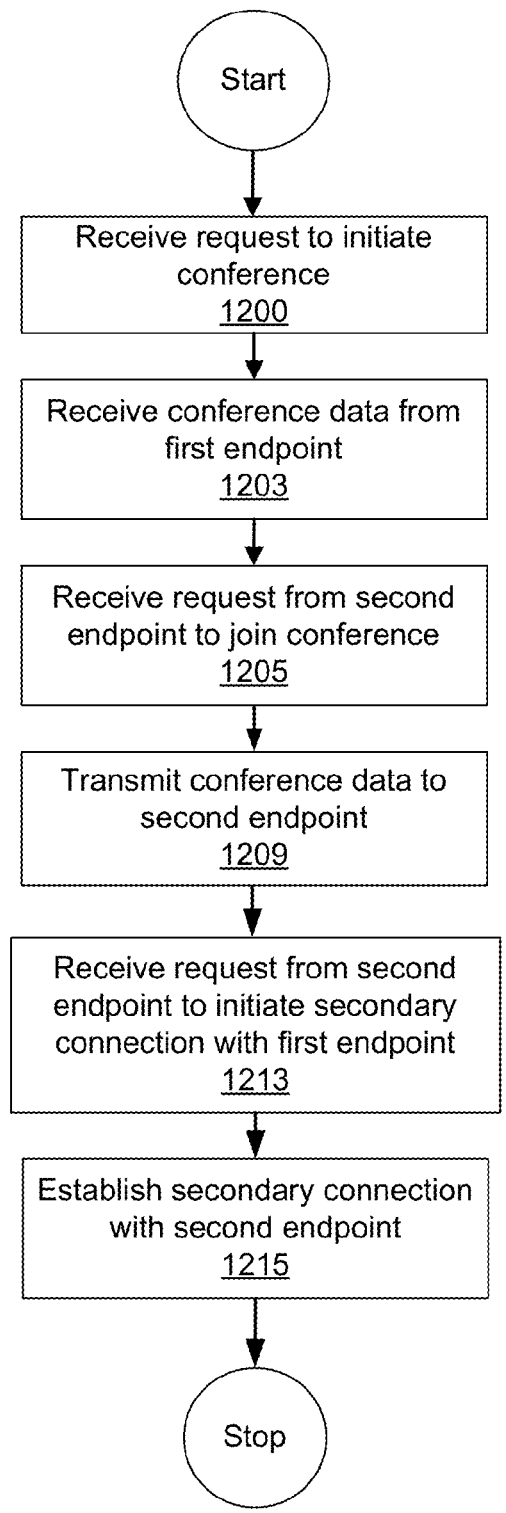
FIG. 12 is a flow diagram illustrating a method for participating in a conference and initiating a secondary connection with conference participants.

FIG. 12 is a flow chart illustrating steps for establishing a sidebar during a conference. The participant control server 120 receives 1200 a request to initiate a conference from a first endpoint 106a (presenter). The participant control server 120 receives 1203 conference data from the first endpoint 106a. The participant control server 120 receives 1205 a request from a second endpoint 106b to join the conference. The participant control server 120 transmits 1209 conference data to the second endpoint 106b. The participant control server 120 receives 1213 a request from the second endpoint 106b to initiate a secondary connection with the first endpoint 106a. The participant control server 120 establishes 1215 a secondary connection with the second endpoint 106b. The secondary connection includes, for example, instant messaging, a telephone call, email or control over any part of the conference data for review and discussion.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A method for controlling conference data individually, the method comprising:
receiving from a first endpoint a request to initiate a conference;
receiving conference data from the first endpoint;
recording the conference data from the first endpoint;
receiving from a second endpoint a request to join the conference;
transmitting the conference data to the second endpoint;
receiving a request from the second endpoint to perform one from the group of positioning to an annotation, pause, fast-forward and rewind of the conference data;
transmitting recorded conference data to the second endpoint that is responsive to the request, wherein the recorded conference data is simultaneously presented with real-time conference data by the second endpoint;
receiving a request from the second endpoint to establish a ghost hold;
muting the second endpoint's microphone input;
receiving a request from the second endpoint to establish a secondary connection;
establishing the secondary connection for the second endpoint;
associating the second endpoint's microphone input with the secondary connection; and
transmitting audio for the second endpoint from the second endpoint's microphone input.

2. The method of claim 1, wherein the conference data comprises one from the group of audio, video and web sessions.

3. The method of claim 2, wherein the audio, video and web sessions are recorded independently.

4. The method of claim 1, wherein conference data for each participant is recorded independently.

5. The method of claim 1, further comprising the step of:
responsive to the request from the second endpoint, adjusting a read pointer and state information for the second endpoint to point to a location requested by the second endpoint.

6. The method of claim 1, wherein the second endpoint joins an ante room to view the recorded conference data before joining the conference.

7. The method of claim 6, wherein other endpoints are notified when the second endpoint joins the ante room.

8. The method of claim 1, further comprising the steps of:
transmitting audio conference data to a first speaker output; and
transmitting audio output for the secondary connection to a second speaker output.

9. The method of claim 1, wherein audio conference data is output at a lower volume than audio output for the secondary connection.

10. The method of claim 1, further comprising the step of:
receiving a request from the second endpoint to establish a secondary connection with the first endpoint, the secondary connection comprising one from the group of instant messaging, a telephone call, email and control of conference data.

11. The method of claim 1, further comprising the step of annotating the conference data.

12. The method of claim 11, further comprising the step of reviewing conference data at each annotation.

13. The method of claim 1, further comprising the step of:
switching to a lower bandwidth codec that accommodates an additional stream without requiring any additional bandwidth beyond what has already been allocated.

14. A participant control system for controlling conference data individually, the participant control system configured to receive conference data from a first endpoint and configured to transmit the conference data to a second endpoint, the participant control system comprising:
a recording module configured to receive the conference data and to transfer the conference data for recording;
a presentation data store communicatively coupled to the recording module and configured to store conference data;
a participant state manager communicatively coupled to the presentation data store and configured to maintain a read pointer and state information for the first endpoint and the second endpoint, the participant state manager communicatively coupled to receive control signals from the first and second endpoint and in response to modify the position of the read pointer and state information;

a user interface module coupled to the participant state manager, configured to communicate with the first and second endpoints for enabling the first and second endpoints to control the presentation of conference data, wherein the conference data comprises recorded conference data and real-time conference data; and a participant control server communicatively coupled communicate with the second endpoint and configured to receive a request from the second endpoint to establish a ghost hold, mute the second endpoint's microphone input, receive a request from the second endpoint to establish a secondary connection, establish the secondary connection for the second endpoint, associate the second endpoint's microphone input with the secondary connection and transmit audio for the second endpoint from the second endpoint's microphone input.

15. The system of claim 14, wherein the conference data comprises one from the group of audio, video and web sessions.

16. The system of claim 14, wherein conference data for each participant is recorded independently.

17. The system of claim 14, wherein the participant control system is part of one from the group of a conference bridge, a switch and an endpoint.

18. The system of claim 14, wherein the participant control system is distributed in an IP telephony system.

19. The system of claim 14, wherein the presentation data store is a current presentation data store to store conference data for an ongoing conference.

20. The system of claim 14, wherein the presentation data store is a past presentation data store to store conference data once the conference is complete.

21. The system of claim 14, wherein the control signals received by the participant state manager include a request to perform one from the group of positioning to an annotation, fast forward, rewind and pause of the conference data.

22. The system of claim 14, wherein the presentation of the data at the first end point is individually controllable and independent of presentation of data at the second endpoint.

23. The system of claim 14, further comprising a third endpoint, and wherein the presentation of the data at the third end point is individually controllable and independent of presentation of data at the first and second endpoints.

24. The system of claim 23, wherein the participant control system receives a request from the second endpoint to initiate a sidebar with the third endpoint, the sidebar comprising a communication that is independent of the conference.

25. The system of claim 24, wherein the sidebar provides independent control over conference data.

26. The system of claim 14, wherein the user interface module generates a display having a button to mute the audio of the second endpoint and a button configured to pause the image captured and sent by the second endpoint.

27. The system of claim 14, wherein the recording module is configured to receive annotations for the conference data and wherein the user interface module displays the annotations in conjunction with the conference data.

28. The system of claim 27, wherein the annotations indicate a section for participants to review.

29. The system of claim 27, wherein the user interface module displays a list of annotations in conjunction with the conference data and wherein selecting an annotation causes the conference data to play from the location of the annotation.

30. The system of claim 14, wherein the recording module is configured to receive notes for the conference data and is configured to associate the notes with a specific endpoint.

31. The system of claim 14, wherein the user interface module generates a user interface that allows selection of outputting two from the group of audio data, video data and web data.

32. The system of claim 14 wherein the participant control system switches to a lower bandwidth codec that accommodates an additional stream without requiring any additional bandwidth beyond what has already been allocated.

* * * * *